(12) United States Patent
Wang et al.

(10) Patent No.: US 10,785,743 B2
(45) Date of Patent: Sep. 22, 2020

(54) POSITIONING METHOD AND APPARATUS

(71) Applicant: Huawei Technologies Co., Ltd., Shenzhen (CN)

(72) Inventors: Kaiyao Wang, Beijing (CN); Yongjun Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/277,257

(22) Filed: Feb. 15, 2019

(65) Prior Publication Data

US 2019/0182796 A1 Jun. 13, 2019

Related U.S. Application Data

(63) Continuation of application No. PCT/CN2017/097248, filed on Aug. 11, 2017.

(30) Foreign Application Priority Data

Aug. 15, 2016 (CN) .......................... 2016 1 0674329

(51) Int. Cl.
*H04W 64/00* (2009.01)
*G01S 5/14* (2006.01)
(Continued)

(52) U.S. Cl.
CPC ............. *H04W 64/003* (2013.01); *G01S 5/14* (2013.01); *G01S 5/0063* (2013.01); *G01S 11/08* (2013.01); *H04W 64/00* (2013.01)

(58) Field of Classification Search
CPC ....... H04W 64/003; H04W 64/00; G01S 5/14; G01S 5/0063; G01S 11/08; G01S 5/0205; G01S 13/765; G01S 5/10; G01S 5/02
(Continued)

(56) References Cited

U.S. PATENT DOCUMENTS 9,288,625 B2 3/2016 Lindskog et al.
2005/0208951 A1* 9/2005 Annunziato .............. G01S 5/02
455/456.1
(Continued)

FOREIGN PATENT DOCUMENTS

CN 101203024 A 6/2008
CN 102695269 A 9/2012
(Continued)

OTHER PUBLICATIONS

Machine Translation and Abstract of Chinese Publication No. CN1045817939, Apr. 29, 2015, 21 pages.
(Continued)

*Primary Examiner* — Michael Y Mapa
(74) *Attorney, Agent, or Firm* — Conley Rose, P.C.

(57) ABSTRACT

A positioning method includes sending, by a to-be-positioned node, a first request to a first node, where the first request includes device information of N second nodes, and the N is a positive integer greater than or equal to one, receiving measurement information from the first node, where the measurement information includes location information of the N second nodes and distances between the first node and the N second nodes, and obtaining location information of the to-be-positioned node according to the measurement information and measurement time information obtained through monitoring a process in which the first node performs distance measurement.

20 Claims, 7 Drawing Sheets

(51) Int. Cl.
  *G01S 5/00* (2006.01)
  *G01S 11/08* (2006.01)
  *G01S 5/02* (2010.01)
  *G01S 13/76* (2006.01)
  *G01S 5/10* (2006.01)

(58) Field of Classification Search
  USPC .............................................. 455/456.1–457
  See application file for complete search history.

(56) References Cited

U.S. PATENT DOCUMENTS

| | | | |
|---|---|---|---|
| 2008/0096581 A1* | 4/2008 | Do .................. | H04W 48/10 455/456.2 |
| 2009/0245206 A1 | 10/2009 | Liu | |
| 2012/0314587 A1* | 12/2012 | Curticapean ......... | G01S 5/0284 370/252 |
| 2014/0160951 A1 | 6/2014 | Alpert et al. | |
| 2014/0187259 A1 | 7/2014 | Kakani et al. | |
| 2015/0063138 A1 | 3/2015 | Aldana et al. | |
| 2015/0094103 A1 | 4/2015 | Wang et al. | |
| 2015/0382143 A1* | 12/2015 | Lindskog .............. | H04W 4/023 455/456.1 |
| 2016/0109554 A1 | 4/2016 | Stephens et al. | |

FOREIGN PATENT DOCUMENTS

| | | |
|---|---|---|
| CN | 104581739 A | 4/2015 |
| CN | 105492922 A | 4/2016 |
| JP | 2009229393 A | 10/2009 |

OTHER PUBLICATIONS

Machine Translation and Abstract of Japanese Publication No. JP2009229393, Oct. 8, 2009, 32 pages.
Foreign Communication From a Counterpart Application, PCT Application No. PCT/CN2017/097248, English Translation of International Search Report dated Nov. 10, 2017, 3 pages.
Foreign Communication From a Counterpart Application, PCT Application No. PCT/CN2017/097248, English Translation of Written Opinion dated Nov. 10, 2017, 4 pages.
Machine Translation and Abstract of Chinese Publication No. CN102695269, Sep. 26, 2012, 32 pages.
Foreign Communication From a Counterpart Application, Chinese Application No. 201610674329.5, Chinese Office Action dated Aug. 12, 2019, 5 pages.
Foreign Communication From a Counterpart Application, European Application No. 17841004.9, Extended European Search Report dated Aug. 7, 2019, 10 pages.

* cited by examiner

POSITIONING METHOD AND APPARATUS

CROSS-REFERENCE TO RELATED APPLICATIONS

This application is a continuation of International Patent Application No. PCT/CN2017/097248 filed on Aug. 11, 2017, which claims priority to Chinese Patent Application No. 201610674329.5 filed on Aug. 15, 2016. The disclosures of the aforementioned applications are hereby incorporated by reference in their entireties.

TECHNICAL FIELD

This disclosure relates to the field of wireless communications technologies, and in particular, to a positioning method and apparatus.

BACKGROUND

With popularization and development of wireless communications technologies, the wireless communications technologies can not only be applied to communications, but also be applied to positioning. For example, a terminal such as a mobile phone is positioned using a wireless communications technology in order to provide information about surrounding businesses or tourist attractions to a user according to a positioning result. As people have ever-increasing requirements for quality of life, requirements for positioning accuracy are also increasing, to meet a positioning requirement in daily life more conveniently.

In a related technology, a method for implementing positioning using a wireless communications technology may be obtaining, using a distance measurement method, distances between a to-be-positioned node and at least three anchor nodes whose locations have been known, and obtaining location information of the to-be-positioned node according to known location information of the anchor nodes and the distances between the anchor nodes and the to-be-positioned node.

In a process of implementing this disclosure, the inventor finds the following problem.

To position any to-be-positioned node, distances between the to-be-positioned node and at least three anchor nodes need to be obtained. Many times of distance measurement are required in a positioning process, and the process becomes cumbersome, resulting in low positioning efficiency.

SUMMARY

To resolve the foregoing problem, embodiments of this disclosure provide a positioning method and apparatus. The technical solutions are as follows.

According to one aspect, a positioning method is provided, where the method includes sending, by a to-be-positioned node, a first request to a first node, where the first request includes device information of N second nodes, and N is a positive integer greater than or equal to 1, receiving measurement information returned by the first node, where the measurement information includes at least location information of the N second nodes and distances between the first node and the N second nodes, and obtaining location information of the to-be-positioned node according to the measurement information and measurement time information that is obtained through monitoring in a process in which the first node performs distance measurement.

The to-be-positioned node is positioned using measurement information obtained in a process in which the first node measures a distance between the first node and another node, reducing times of performing distance measurement between the to-be-positioned node and other nodes to obtain measurement information. This can simplify a positioning process and improve positioning efficiency.

In a first possible implementation of the first aspect of this disclosure, a frame format of the first request includes a category field, an action field, a length field, and N address fields, where the category field is used to indicate whether the first request is a public action frame signal, the action field is used to indicate a frame signal type, the length field is used to store a quantity N of device information of the N second nodes, and each address field is used to store device information of one second node.

The first request is sent using the frame format including the category field, the action field, the length field, and the N address fields such that information included in the first request can be sent completely while bandwidth is occupied as less as possible. This can increase a success rate of sending a request, and improve positioning efficiency.

In a second possible implementation of the first aspect of this disclosure, a frame format of the measurement information includes a category field, an action field, a length field, and N distance fields, and each distance field includes an address field, a distance subfield, and an allowed error value field, where the category field is used to indicate whether the measurement information is a public action frame signal, the action field is used to indicate a frame signal type, the length field is used to store a quantity N of device information of the N second nodes, and in each distance field, the distance subfield is used to indicate a distance between the first node and any one of the N second nodes, each address field is used to store device information of one second node, and the allowed error value field is used to indicate a maximum allowed measurement error value of the distance.

The measurement information is sent using the frame format including the category field, the action field, the length field, and the N distance fields such that information included in the measurement information can be sent completely while bandwidth is occupied as less as possible. This can increase a success rate of sending measurement information, and improve positioning efficiency.

In a third possible implementation of the first aspect of this disclosure, before obtaining location information of the to-be-positioned node according to the measurement information and measurement time information that is obtained through monitoring in a process in which the first node performs distance measurement, the method further includes obtaining a distance value L1 when N is 2 and the measurement information includes M1, M3, $(X_{STA1}, Y_{STA1})$, $(X_{AP1}, Y_{AP1})$, and $(X_{AP3}, Y_{AP3})$, and accordingly, obtaining location information of the to-be-positioned node according to the measurement information and measurement time information that is obtained through monitoring in a process in which the first node performs distance measurement includes separately obtaining $D_{(STA2-STA1,STA2-AP1)} = L1-L2$ and $D_{(STA2-STA1,STA2-AP3)} = L1-L3$ according to M1, M3, and the measurement time information, obtaining the distance value L2 and the distance value L3 according to $D_{(STA2-STA1,STA2-AP1)}$, $D_{(STA2-STA1,STA2-AP3)}$, and the obtained distance value L1, and obtaining the location information of the to-be-positioned node according to the distance value L1, the distance value L2, the distance value L3, $(X_{STA1}, Y_{STA1})$, $(X_{AP1}, Y_{AP1})$, and $(X_{AP3}, Y_{AP3})$, where the STA1 is the first node, the STA2 is the to-be-positioned node, the AP1 and the AP3 are the second nodes, M1 is a distance between the STA1 and the AP1, M3 is a distance between the STA1 and the AP3, $(X_{STA1}, Y_{STA1})$, $(X_{AP1}, Y_{AP1})$, and $(X_{AP3}, Y_{AP3})$ are location information of the STA1, location information of the AP1, and location information of the AP3, respectively, L1 is a distance between the STA2 and the STA1, L2 is a distance between the STA2 and the AP1, and L3 is a distance between the STA2 and the AP3.

When positioning is performed using the foregoing positioning method, a distance between the to-be-positioned node and the first node or any second node in a monitoring area needs to be measured only once using a distance measurement method, and a positioning objective is achieved according to the distance, the measurement information obtained from the first node, and measurement time information that is obtained through monitoring in a monitoring process in which distance measurement is performed between the first node and two second nodes that are in the monitoring area of the to-be-positioned node, reducing times of performing distance measurement between the to-be-positioned node and other nodes. This simplifies a positioning process and improves positioning efficiency.

The step of obtaining location information of the to-be-positioned node according to the measurement information and measurement time information that is obtained through monitoring in a process in which the first node performs distance measurement includes separately obtaining $D_{(STA2-STA1,STA2-AP1)}$=L1−L2, $D_{(STA2-STA1,STA2-AP2)}$=L1−L3, and $D_{(STA2-STA1,STA2-AP3)}$=L1−L4 according to M1, M2, M3, and the measurement time information when N is 3 and the measurement information includes M1, M2, M3, $(X_{AP1}, Y_{AP1})$, $(X_{AP2}, Y_{AP2})$, and $(X_{AP3}, Y_{AP3})$, in a fourth possible implementation of the first aspect of this disclosure, separately obtaining $D_{(STA2-AP2,STA2-AP1)}$=L3−L2, $D_{(STA2-AP3,STA2-AP1)}$=L4−L2, and $D_{(STA2-AP3,STA2-AP2)}$=L4−L3 according to $D_{(STA2-STA1,STA2-AP1)}$=L1−L2, $D_{(STA2-STA1,STA2-AP2)}$=L1−L3, and $D_{(STA2-STA1,STA2-AP3)}$=L1−L4, and obtaining the location information of the to-be-positioned node according to $D_{(STA2-AP2,STA2-AP1)}$, $D_{(STA2-AP3,STA2-AP1)}$, $D_{(STA2-AP3,STA2-AP2)}$, $(X_{AP1}, Y_{AP1})$, $(X_{AP2}, Y_{AP2})$, and $(X_{AP3}, Y_{AP3})$, where the STA1 is the first node, the STA2 is the to-be-positioned node, the AP1, the AP2, and the AP3 are the second nodes, M1 is a distance between the STA1 and the AP1, M2 is a distance between the STA1 and the AP2, M3 is a distance between the STA1 and the AP3, $(X_{AP1}, Y_{AP1})$, $(X_{AP2}, Y_{AP2})$, and $(X_{AP3}, Y_{AP3})$ are location information of the AP1, location information of the AP2, and location information of the AP3, respectively, L1 is a distance between the STA2 and the STA1, L2 is a distance between the STA2 and the AP1, L3 is a distance between the STA2 and the AP2, and L4 is a distance between the STA2 and the AP3.

The foregoing positioning method can implement positioning without using location information of the first node. Because the location information of the first node also needs to be obtained using a positioning method, an error is inevitable. If the location information of the first node is not used, and only the measurement time information that is obtained through monitoring in the process in which the first node performs distance measurement and the measurement information obtained from the first node are used for positioning, a greater error caused by the error existing when the location information of the first node is used can be avoided. That is, the foregoing positioning method can improve positioning accuracy while reducing times of performing distance measurement between the to-be-positioned node and other nodes, simplifying a positioning process, and improving positioning efficiency.

In a fifth possible implementation of the first aspect of this disclosure, the first node is configured to store measurement information of at least one first node.

The specified second node stores the measurement information of the at least one first node in order to ensure that when positioning is performed, measurement information required for positioning the to-be-positioned node is obtained directly from the specified second node to implement positioning. Because the specified second node has a fixed location, positioning efficiency can further be improved, and a positioning error can be reduced.

In a sixth possible implementation of the first aspect of this disclosure, a frame format of the first request includes a category field, an action field, a length field, and N address pair fields, where the category field is used to indicate whether the first request is a public action frame signal, the action field is used to indicate a frame signal type, the length field is used to store a quantity N of device information of the N second nodes, and each address pair field is used to store device information of the first node and device information of any one of the N second nodes.

The first request is sent using the frame format including the category field, the action field, the length field, and at least one address pair field such that information included in the first request can be sent completely while bandwidth is occupied as less as possible. This can increase a success rate of sending a request, and improve positioning efficiency.

In a seventh possible implementation of the first aspect of this disclosure, a frame format of the measurement information includes a category field, an action field, a length field, and N distance fields, and each distance field includes an address pair field, a distance subfield, and an allowed error value field, where the category field is used to indicate whether the measurement information is a public action frame signal, the action field is used to indicate a frame signal type, the length field is used to store a quantity N of device information of the N second nodes, and in each distance field, the address pair field is used to store device information of the first node and device information of any one of the N second nodes, the distance subfield is used to store a distance between the first node and the second node, and the allowed error value field is used to indicate a maximum allowed measurement error value of the distance stored in the distance subfield.

The measurement information is sent using the frame format including the category field, the action field, the length field, and the N distance fields such that information included in the measurement information can be sent completely while bandwidth is occupied as less as possible. This can increase a success rate of sending measurement information, and improve positioning efficiency.

In an eighth possible implementation of the first aspect of this disclosure, before sending, by a to-be-positioned node, a first request to a first node, the method further includes monitoring, by the to-be-positioned node, a process in which distance measurement is performed between the first node and any one of the N second nodes to obtain the measurement time information, where the monitoring, by the to-be-positioned node, a process in which distance measurement is performed between the first node and the second node includes receiving a measurement signal sent by the second node, storing receive time information of the measurement signal and device information of the second node, receiving an acknowledgement signal sent by the first node, storing receive time information of the acknowledgement signal and device information of the first node, receiving signal transmit and receive time information sent by the second node to the to-be-positioned node, where the signal transmit and receive time information includes information about a time at which the second node sends the measurement signal and information about a time at which the second node receives the acknowledgement signal, and storing the measurement time information, where the measurement time information includes the signal transmit and receive time information, the receive time information of the measurement signal, and the receive time information of the acknowledgement signal.

The distance measurement process of the first node is monitored to obtain the measurement time information such that positioning can be performed according to the measurement time information, positioning by performing a plurality of times of distance measurement can be avoided, and an objective of simplifying a positioning process is achieved.

In a ninth possible implementation of the first aspect of this disclosure, before monitoring, by the to-be-positioned node, a process in which distance measurement is performed between the first node and any one of the N second nodes, the method further includes sending a second request to the first node, where the second request is used to query for at least a distance measurement time, receiving a distance measurement time returned by the first node, and performing, according to the distance measurement time, the step of monitoring a process in which distance measurement is performed between the first node and any one of the N second nodes.

The first node is queried for the distance measurement time, and a monitoring state is entered according to the distance measurement time returned by the first node such that a case in which relatively large energy consumption is caused because the monitoring state is kept all the time can be avoided.

In a tenth possible implementation of the first aspect of this disclosure, the second request is further used to query whether the measurement information is allowed to be returned, and accordingly, before sending, by a to-be-positioned node, a first request to a first node, the method further includes, when receiving reply information, performing, by the to-be-positioned node, the step of sending a first request to a first node, where the reply information is used to indicate that the measurement information is allowed to be returned.

The first node is queried whether to agree to return the measurement information, and when the reply information used to indicate that the measurement information is allowed to be returned is received, the step of sending the first request to the first node is performed. This can increase a probability of successful positioning and avoid an excessively long waiting time caused because the first node is unable to or disagrees to return the measurement information, and further, can improve positioning efficiency.

According to another aspect, a positioning apparatus is provided, where the apparatus includes a sending module configured to send a first request to a first node, where the first request includes device information of N second nodes, and N is a positive integer greater than or equal to 1, a receiving module configured to receive measurement information returned by the first node, where the measurement information includes at least location information of the N second nodes and distances between the first node and the N second nodes, and a positioning module configured to obtain location information of a to-be-positioned node according to the measurement information and measurement time information that is obtained through monitoring in a process in which the first node performs distance measurement.

The to-be-positioned node is positioned using measurement information obtained in a process in which the first node measures a distance between the first node and another node, reducing times of performing distance measurement between the to-be-positioned node and other nodes to obtain measurement information. This can simplify a positioning process and improve positioning efficiency.

In a first possible implementation of the second aspect of this disclosure, a frame format of the first request includes a category field, an action field, a length field, and N address fields, where the category field is used to indicate whether the first request is a public action frame signal, the action field is used to indicate a frame signal type, the length field is used to store a quantity N of device information of the N second nodes, and each address field is used to store device information of one second node.

The first request is sent using the frame format including the category field, the action field, the length field, and the N address fields such that information included in the first request can be sent completely while bandwidth is occupied as less as possible. This can increase a success rate of sending a request, and improve positioning efficiency.

In a second possible implementation of the second aspect of this disclosure, a frame format of the measurement information includes a category field, an action field, a length field, and N distance fields, and each distance field includes an address field, a distance subfield, and an allowed error value field, where the category field is used to indicate whether the measurement information is a public action frame signal, the action field is used to indicate a frame signal type the length field is used to store a quantity N of device information of the N second nodes, and in each distance field, the distance subfield is used to indicate a distance between the first node and any one of the at least one second node, each address field is used to store device information of one second node, and the allowed error value field is used to indicate a maximum allowed measurement error value of the distance.

The measurement information is sent using the frame format including the category field, the action field, the length field, and the N distance fields such that information included in the measurement information can be sent completely while bandwidth is occupied as less as possible. This can increase a success rate of sending measurement information, and improve positioning efficiency.

In a third possible implementation of the second aspect of this disclosure, the apparatus further includes an obtaining module configured to obtain a distance value L1 when N is 2 and the measurement information includes M1, M3, $(X_{STA1}, Y_{STA1})$, $(X_{AP1}, Y_{AP1})$, and $(X_{AP3}, Y_{AP3})$, and accordingly, the positioning module is configured to separately obtain $D_{(STA2-STA1, STA2-AP1)}=L1-L2$ and $D_{(STA2-STA1, STA2-AP3)}=L1-L3$ according to M1, M3, and the measurement time information, obtain the distance value L2 and the distance value L3 according to $D_{(STA2-STA1, STA2-AP1)}$, $D_{(STA2-STA1, STA2-AP3)}$, and the obtained distance value L1, and obtain the location information of the to-be-positioned node according to the distance value L1, the distance value L2, the distance value L3, $(X_{STA1}, Y_{STA1})$, $(X_{AP1}, Y_{AP1})$, and $(X_{AP3}, Y_{AP3})$, where the STA1 is the first node, the STA2 is the to-be-positioned node, the AP1 and the AP3 are the second nodes, M is a distance between the STA1 and the AP1, M3 is a distance between the STA1 and the AP3, $(X_{STA1}, Y_{STA1})$, $(X_{AP1}, Y_{AP1})$, and $(X_{AP3}, Y_{AP3})$ are location information of the STA1, location information of the AP1, and location information of the AP3, respectively, L1 is a distance between the STA2 and the STA1, L2 is a distance between the STA2 and the AP1, and L3 is a distance between the STA2 and the AP3.

When positioning is performed using the foregoing positioning method, a distance between the to-be-positioned node and the first node or any second node in a monitoring area needs to be measured only once using a distance measurement method, and a positioning objective is achieved according to the distance, the measurement information obtained from the first node, and measurement time information that is obtained through monitoring in a monitoring process in which distance measurement is performed between the first node and two second nodes that are in the monitoring area of the to-be-positioned node, reducing times of performing distance measurement between the to-be-positioned node and other nodes. This simplifies a positioning process and improves positioning efficiency.

In a fourth possible implementation of the second aspect of this disclosure, the positioning module is configured to separately obtain $D_{(STA2-STA1,STA2-AP1)}=L1-L2$, $D_{(STA2-STA1,STA2-AP2)}=L1-L3$, and $D_{(STA2-STA1,STA2-AP3)}=L1-L4$ according to M1, M2, M3, and the measurement time information when N is 3 and the measurement information includes M1, M2, M3, $(X_{AP1},Y_{AP1})$, $(X_{AP2},Y_{AP2})$, and $(X_{AP3},Y_{AP3})$, separately obtain $D_{(STA2-AP2,STA2-AP1)}=L3-L2$, $D_{(STA2-AP3,STA2-AP1)}=L4-L2$, and $D_{(STA2-AP3,STA2-AP2)}=L4-L3$ according to $D_{(STA2-STA1,STA2-AP1)}=L1-L2$, $D_{(STA2-STA1,STA2-AP2)}=L1-L3$, and $D_{(STA2-STA1,STA2-AP3)}=L1-L4$, and obtain the location information of the to-be-positioned node according to $D_{(STA2-AP2,STA2-AP1)}$, $D_{(STA2-AP3,STA2-AP1)}$, $D_{(STA2-AP3,STA2-AP2)}$, $(X_{AP1},Y_{AP1})$, $(X_{AP2},Y_{AP2})$, and $(X_{AP3},Y_{AP3})$, where the STA1 is the first node, the STA2 is the to-be-positioned node, the AP1, the AP2, and the AP3 are the second nodes, M1 is a distance between the STA1 and the AP1, M2 is a distance between the STA1 and the AP2, M3 is a distance between the STA1 and the AP3, $(X_{AP1},Y_{AP1})$, $(X_{AP2},Y_{AP2})$, and $(X_{AP3},Y_{AP3})$ are location information of the AP1, location information of the AP2, and location information of the AP3, respectively, L1 is a distance between the STA2 and the STA1, L2 is a distance between the STA2 and the AP1, L3 is a distance between the STA2 and the AP2, and L4 is a distance between the STA2 and the AP3.

The foregoing positioning method can implement positioning without using location information of the first node. Because the location information of the first node also needs to be obtained using a positioning method, an error is inevitable. If the location information of the first node is not used, and only the measurement time information that is obtained through monitoring in the process in which the first node performs distance measurement and the measurement information obtained from the first node are used for positioning, a greater error caused by the error existing when the location information of the first node is used can be avoided. That is, the foregoing positioning method can improve positioning accuracy while reducing times of performing distance measurement between the to-be-positioned node and other nodes, simplifying a positioning process, and improving positioning efficiency.

In a fifth possible implementation of the second aspect of this disclosure, the first node is configured to store measurement information of at least one first node.

The specified second node stores the measurement information of the at least one first node in order to ensure that when positioning is performed, measurement information required for positioning the to-be-positioned node is obtained directly from the specified second node to implement positioning. Because the specified second node has a fixed location, positioning efficiency can further be improved, and a positioning error can be reduced.

In a sixth possible implementation of the second aspect of this disclosure, a frame format of the first request includes a category field, an action field, a length field, and N address pair fields, where the category field is used to indicate whether the first request is a public action frame signal, the action field is used to indicate a frame signal type, the length field is used to store a quantity N of device information of the N second nodes, and each address pair field is used to store device information of the first node and device information of any one of the N second nodes.

The first request is sent using the frame format including the category field, the action field, the length field, and at least one address pair field such that information included in the first request can be sent completely while bandwidth is occupied as less as possible. This can increase a success rate of sending a request, and improve positioning efficiency.

In a seventh possible implementation of the second aspect of this disclosure, a frame format of the measurement information includes a category field, an action field, a length field, and N distance fields, and each distance field includes an address pair field, a distance subfield, and an allowed error value field, where the category field is used to indicate whether the measurement information is a public action frame signal, the action field is used to indicate a frame signal type, the length field is used to store a quantity N of device information of the N second nodes, and in each distance field, the address pair field is used to store device information of the first node and device information of any one of the N second nodes, the distance subfield is used to store a distance between the first node and the second node, and the allowed error value field is used to indicate a maximum allowed measurement error value of the distance stored in the distance subfield.

The measurement information is sent using the frame format including the category field, the action field, the length field, and the N distance fields such that information included in the measurement information can be sent completely while bandwidth is occupied as less as possible. This can increase a success rate of sending measurement information, and improve positioning efficiency.

In an eighth possible implementation of the second aspect of this disclosure, the apparatus further includes a monitoring module configured to monitor a process in which distance measurement is performed between the first node and any one of the N second nodes, to obtain the measurement time information, where the monitoring module is configured to receive a measurement signal sent by the second node, store receive time information of the measurement signal and device information of the second node, receive an acknowledgement signal sent by the first node, store receive time information of the acknowledgement signal and device information of the first node, receive signal transmit and receive time information sent by the second node to the to-be-positioned node, where the signal transmit and receive time information includes information about a time at which the second node sends the measurement signal and information about a time at which the second node receives the acknowledgement signal, and store the measurement time information, where the measurement time information includes the signal transmit and receive time information, the receive time information of the measurement signal, and the receive time information of the acknowledgement signal.

The distance measurement process of the first node is monitored to obtain the measurement time information such that positioning can be performed according to the measurement time information, positioning by performing a plurality of times of distance measurement can be avoided, and an objective of simplifying a positioning process is achieved.

In a ninth possible implementation of the second aspect of this disclosure, the sending module is further configured to send a second request to the first node, where the second request is used to query for at least a distance measurement time, the receiving module is further configured to receive a distance measurement time returned by the first node, and the monitoring module is further configured to perform, according to the distance measurement time, the step of monitoring a process in which distance measurement is performed between the first node and any one of the N second nodes.

The first node is queried for the distance measurement time, and a monitoring state is entered according to the distance measurement time returned by the first node such that a case in which relatively large energy consumption is caused because the monitoring state is kept all the time can be avoided.

In a tenth possible implementation of the second aspect of this disclosure, the second request is further used to query whether the measurement information is allowed to be returned, and accordingly, the sending module is further configured to, when reply information is received, perform the step of sending a first request to a first node, where the reply information is used to indicate that the measurement information is allowed to be returned.

The first node is queried whether to agree to return the measurement information, and when the reply information used to indicate that the measurement information is allowed to be returned is received, the step of sending the first request to the first node is performed. This can increase a probability of successful positioning and avoid an excessively long waiting time caused because the first node is unable to or disagrees to return the measurement information, and further, can improve positioning efficiency.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of this disclosure clearer, the following further describes the implementations of this disclosure in detail with reference to the accompanying drawings.

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with the present disclosure. On the contrary, they are only examples of apparatuses and methods that are described in the appended claims in detail and that are consistent with some aspects of the present disclosure.

Figure 1:
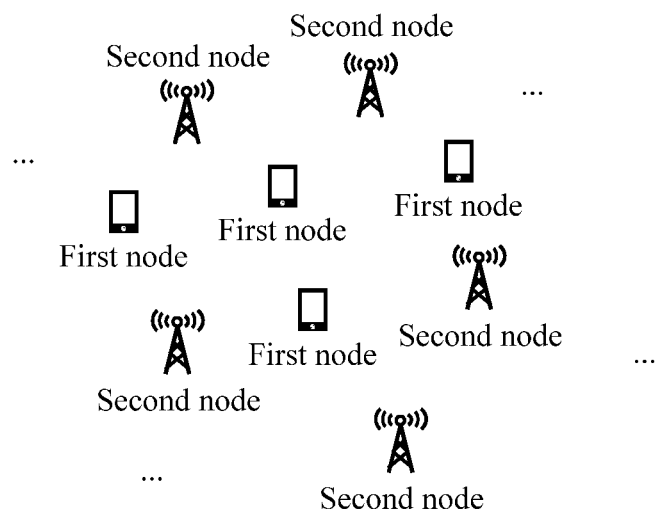
FIG. 1 is a schematic diagram of a positioning system according to an embodiment of this disclosure.

FIG. 1 is a schematic diagram of a positioning system according to an embodiment of this disclosure. As shown in FIG. 1, the positioning system includes a plurality of first nodes and a plurality of second nodes. The second node is a node whose location is known. The node whose location is known means that a node location thereof is stored in the node or in another node that manages location information of a plurality of second nodes and the node may provide a first node with a network access service, for example, an access point (AP). The first node may be a node whose location is unknown, for example, a mobile phone or other mobile terminals, or may be a node whose location is known. The first node may be positioned according to location information of the plurality of second nodes or measurement information of another first node. It should be noted that after any first node performs distance measurement between the first node and at least one second node or the first node is positioned, the first node may be used as a collaborative node that assists another first node, that is, a to-be-positioned node, in positioning.

In the embodiments of this disclosure, in a process in which the to-be-positioned node is being positioned, the second node uses location information of the second node to position the to-be-positioned node, and the first node is used as a collaborative node to assist the to-be-positioned node in positioning. A specific assisting method includes monitoring, by the to-be-positioned node, a process in which distance measurement, such as fine timing measurement (FTM), is performed between the first node and at least one second node to obtain information required for positioning such that the to-be-positioned node is positioned. It should be noted that in the positioning system shown in FIG. 1, any second node whose location is known may be used as a collaborative node to assist the to-be-positioned node in positioning, that is, the first node reports, to the collaborative node, measurement information obtained after the first node performs distance measurement, and the collaborative node manages measurement information of the at least one first node, and when being positioned, the to-be-positioned node obtains, from the collaborative node, measurement information used for positioning.

A positioning method provided in this disclosure may be applied to any scenario in which positioning is needed. For example, when a user needs to search for a restaurant near a current location of the user, a terminal starts a positioning function when detecting a trigger operation performed by the user on a query option, and uses the positioning method provided in this disclosure to obtain current location information of the terminal in order to obtain information about the restaurant around the user according to the location information.

Figure 2A:
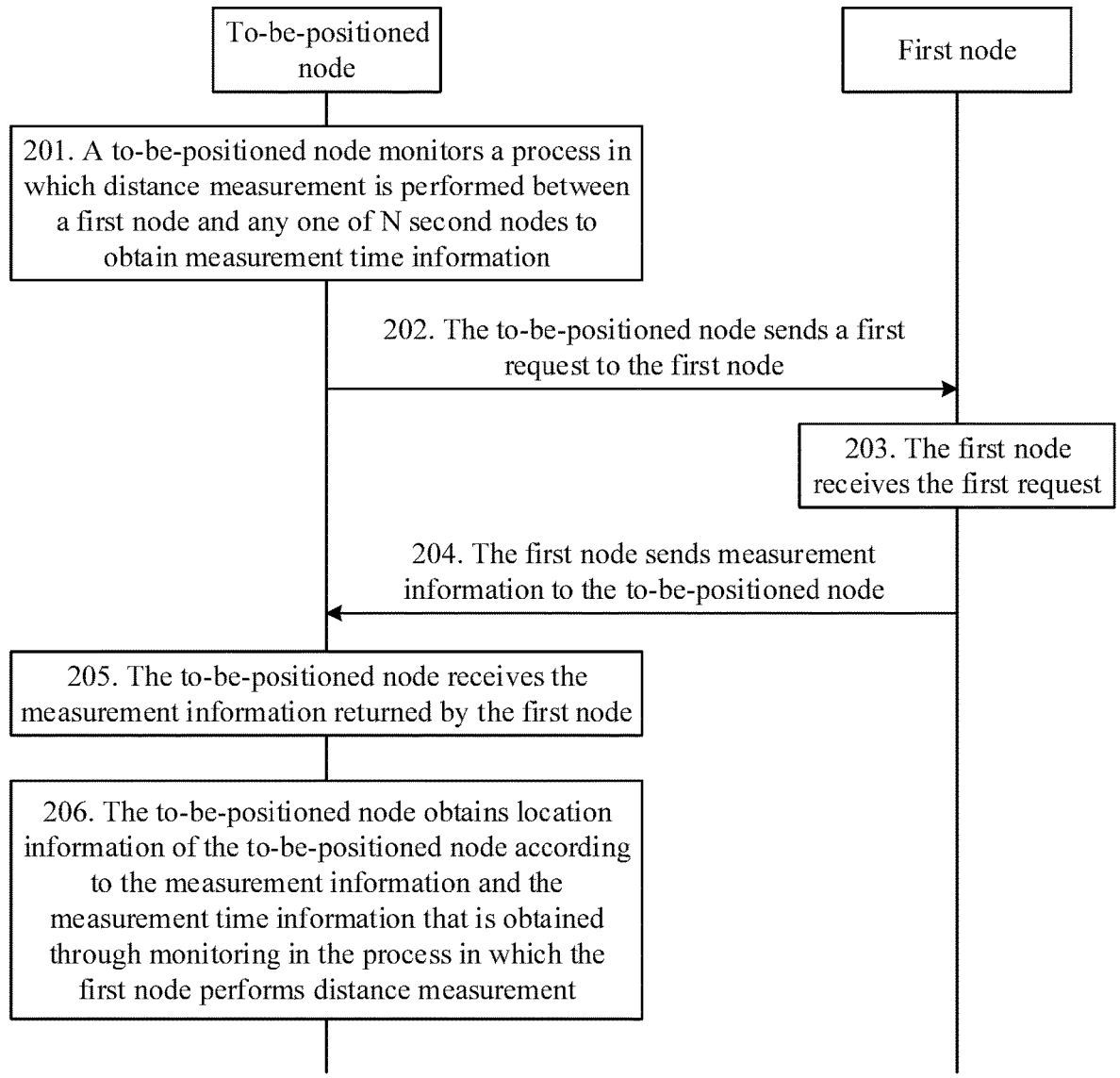
FIG. 2A is a flowchart of a positioning method according to an embodiment of this disclosure.

FIG. 2A is a flowchart of a positioning method according to an embodiment of this disclosure. Referring to FIG. 2A, the method includes the following steps.

Step 201. A to-be-positioned node monitors a process in which distance measurement is performed between a first node and any one of N second nodes to obtain measurement time information.

The to-be-positioned node is any node whose location is unknown, for example, a mobile phone or other mobile terminals. The N second nodes are nodes located in a monitoring area of the to-be-positioned node, where N is a positive integer greater than or equal to 1. That a to-be-positioned node monitors a process in which distance measurement is performed between a first node and any second node is as follows. The to-be-positioned node monitors a data transmission channel between the first node and the any second node, and when interaction information exists between the first node and the second node, receives the interaction information, and records information such as a receive time of the interaction information.

Further, a method for monitoring, by the to-be-positioned node, the process in which distance measurement is performed between the first node and the second node includes steps 201a to 201f.

Step 201a. The to-be-positioned node receives a measurement signal sent by the second node.

Measurement signals may differ as distance measurement methods vary. In this embodiment of this disclosure, the positioning method provided in this disclosure is further described using an example in which the distance measurement method is an FTM method.

Figure 2B:
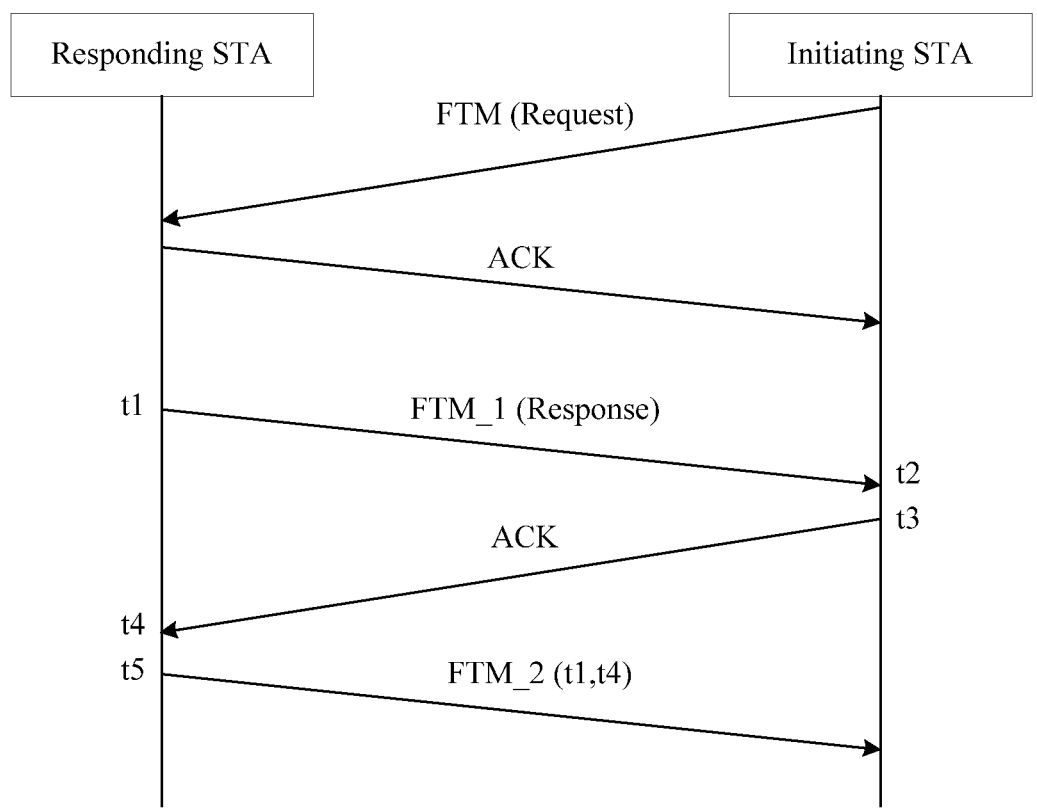
FIG. 2B is a schematic diagram of a distance measurement method according to an embodiment of this disclosure.

FTM is a method for calculating, using a time stamp, a distance between an initiating station (STA) and a responding STA on which a distance measurement operation is performed. As shown in FIG. 2B, when an initiating STA needs to measure a distance between the initiating STA and a responding STA, the initiating STA sends an FTM request frame signal to the responding STA, where the FTM request frame signal is used to instruct to request the responding STA to use the FTM method to measure the distance between the initiating STA and the responding STA. After receiving the FTM request frame signal, the responding STA replies with an acknowledgement (also referred to as ACK) frame signal, where the ACK frame signal is used to indicate that the responding STA has received the request initiated by the initiating STA. The responding STA sends an FTM_1 frame signal to the initiating STA at a moment t1, where the FTM_1 frame signal is used to indicate that the responding STA agrees to measure the distance between the initiating STA and the responding STA. The initiating STA receives the FTM_1 frame signal at a moment t2, and replies with an ACK frame signal at a moment t3. The responding STA receives the ACK frame signal at a moment t4, and sends, at a moment t5, an FTM_2 frame signal including time information t1 and t4 to the initiating STA such that the initiating STA calculates the distance between the initiating STA and the responding STA according to the following formula (1), where c represents a light speed, and * represents a multiplication operation:

$$d = \frac{(t4 - t1) + (t3 - t2)}{2} * c. \tag{1}$$

Figure 2C:
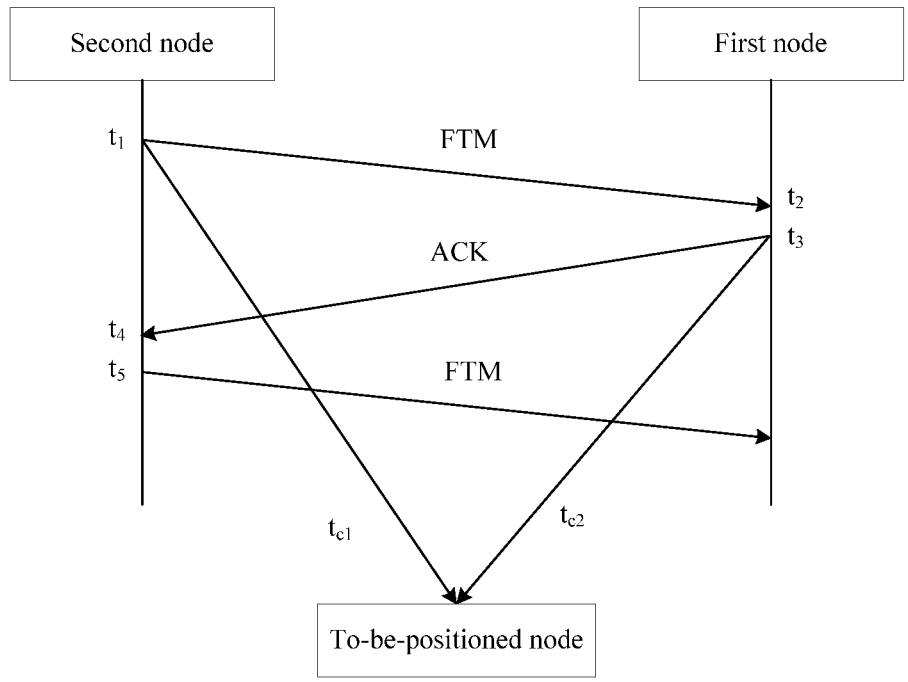
FIG. 2C is a schematic diagram of monitoring distance measurement according to an embodiment of this disclosure.

When the to-be-positioned node needs to obtain location information of the to-be-positioned node, the to-be-positioned node enables a monitoring mode such that the to-be-positioned node is kept in a monitoring state all the time, to obtain measurement time information in a process in which distance measurement is performed between other nodes. As shown in FIG. 2C, when distance measurement is performed between a first node and a second node, the to-be-positioned node monitors the distance measurement process. At a moment $t_1$, the second node sends an FTM frame signal to the first node, and the to-be-positioned node receives the FTM frame signal in a data transmission channel between the second node and the first node, where the FTM signal is a measurement signal.

It should be noted that the monitoring mode may be enabled when the to-be-positioned node detects a start operation performed on a positioning function, and for an application (also referred to as APP) having a positioning permission of the to-be-positioned node, the monitoring mode may be enabled when a trigger operation performed on a search option on the APP is detected, or may be enabled when a start operation of the APP is detected. The APP may be a takeaway APP, a taxi APP, or the like. In this embodiment of this disclosure, a specific enabling moment or enabling manner of the monitoring mode is not limited.

Step 201b. The to-be-positioned node stores receive time information of the measurement signal and device information of the second node.

The device information of the second node may be Media Access Control (MAC) address information of the second node, or may be other device information that can uniquely identify the second node. This is not limited in this embodiment of this disclosure. The FTM frame signal carries the device information of the second node. The to-be-positioned node stores the device information of the second node and receive time information of the FTM frame signal in a corresponding manner.

Step 201c. The to-be-positioned node receives an acknowledgement signal sent by the first node.

The acknowledgement signal is a signal used, by the first node to respond to the measurement signal, after the first node receives the measurement signal. In FIG. 2C, after receiving the FTM frame signal, the first node sends an ACK frame signal at a moment t3, and the ACK frame signal is the acknowledgement signal. The to-be-positioned node receives the ACK frame signal in a data transmission channel between the second node and the first node.

Step 201d. The to-be-positioned node stores receive time information of the acknowledgement signal and device information of the first node.

After receiving the acknowledgement signal, the to-be-positioned node stores a receive time $t_{c2}$ of the acknowledgement signal, and stores the device information of the first node and the receive time of the acknowledgement signal in a corresponding manner. The device information of the first node is similar to the device information of the second node. The device information of the second node and the device information of the first node may be information of a same type, or may be information of different types. This is not limited in this embodiment of this disclosure.

Step 201e. The to-be-positioned node receives signal transmit and receive time information sent by the second node to the to-be-positioned node, where the signal transmit and receive time information includes information about a time at which the second node sends the measurement signal and information about a time at which the second node receives the acknowledgement signal.

After receiving the acknowledgement signal sent by the first node, the second node sends, to the to-be-positioned node, the information about the time at which the second node sends the measurement signal and the information about the time at which the second node receives the acknowledgement signal. As shown in FIG. 2C, the second node sends time information $t_1$ and $t_4$ to the to-be-positioned node and the first node, and the to-be-positioned node receives signal transmit and receive time information sent by the second node to the to-be-positioned node. The signal transmit and receive time information includes information about a time at which the second node sends the measurement signal and information about a time at which the second node receives the acknowledgement signal.

Step 201f. The to-be-positioned node stores the measurement time information, where the measurement time information includes the signal transmit and receive time information, the receive time information of the measurement signal, and the receive time information of the acknowledgement signal.

The to-be-positioned node stores, in a corresponding manner, the signal transmit and receive time information received in step 201e, the receive time information of the measurement signal, and the receive time information of the acknowledgement signal.

When a time at which the to-be-positioned node receives the measurement signal is $t_{c1}$, a time at which the to-be-positioned node receives the acknowledgement signal is $t_{c2}$, and time information that is sent by the second node at a moment $t_5$ and that is received by the first node is $t_1$ and $t_4$, a distance L between the first node and the second node is obtained according to formula (1) such that in a process in which the to-be-positioned node is being positioned, the first node can send the distance L to the to-be-positioned node, and further, the to-be-positioned node can calculate a distance difference between a distance between the first node and the to-be-positioned node and a distance between the second node and the to-be-positioned node according to the following formula (2):

$$D = c * \left( t_{c1} - t_{c2} - \frac{L}{c} - (t_1 - t_4) \right). \quad (2)$$

It should be noted that step 201 is a process in which the to-be-positioned node monitors distance measurement performed between the first node and the any second node, and step 201 is optional in a process in which the to-be-positioned node is being positioned, that is, information obtained through monitoring in step 201 only needs to be stored correspondingly, and the information is obtained from corresponding storage space when the to-be-positioned node is to be positioned. That is, step 201 may be performed when the to-be-positioned node needs to be positioned, or may be performed in a process in which the first node performs distance measurement when the to-be-positioned node is not positioned. That is, in this embodiment of this disclosure, a specific implementation time of step 201 is not limited.

The distance measurement process of the first node is monitored to obtain the measurement time information such that the to-be-positioned node can be positioned according to the measurement time information, positioning by performing a plurality of times of distance measurement can be avoided, and an objective of simplifying a positioning process is achieved.

After the first node completes distance measurement between the first node and at least one second node or the first node is positioned, the first node may provide positioning help to another to-be-positioned node. That is, the first node may be used as a collaborative node, and when the to-be-positioned node is being positioned, provides information required for positioning to the to-be-positioned node such that the to-be-positioned node can use the information to implement positioning, without performing distance measurement operations for a plurality of times.

Step 202. The to-be-positioned node sends a first request to the first node, where the first request includes device information of the N second nodes, and N is a positive integer greater than or equal to 1.

After monitoring a process in which the first node performs distance measurement between the first node and the N second nodes, the to-be-positioned node sends a first request to the first node. The first request is used to obtain measurement information from the first node. The measurement information is distance information obtained in the process in which the first node performs distance measurement between the first node and the N second nodes, or the like.

The first request used to obtain the measurement information is sent to the first node such that the first node can return, according to the first request, the corresponding measurement information, and further, can achieve an objective of positioning the to-be-positioned node according to the measurement information.

In another embodiment of this disclosure, a frame format of the first request includes a category field, an action field, a length field, and N address fields. The category field is used to indicate whether the first request is a public action frame signal. The action field is used to indicate a frame signal type. The length field is used to store a quantity N of device information of the N second nodes, that is, a quantity of the second nodes. Each address field is used to store device information of one second node.

Figure 2D:
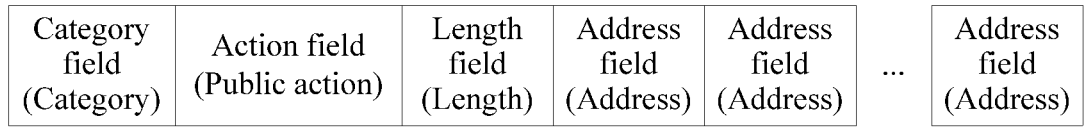
FIG. 2D is a schematic diagram of a request frame format according to an embodiment of this disclosure.

FIG. 2D is a schematic diagram of a request frame format according to an embodiment of this disclosure. In FIG. 2D, a location corresponding to Category is a category field, and when a value at the location is 4, a frame signal of the first request is a public action frame signal.

A location corresponding to Public action is an action field. When a value of the action field is a first preset value, the frame signal is an FTM request frame signal for distance measurement. When a value of the action field is a second preset value, the frame signal is an FTM report frame signal for distance measurement. The first preset value and the second preset value may be set to any two different values. For example, the first preset value may be 34, and the second preset value may be 35. Certainly, the first preset value and the second preset value may alternatively be set to other values. This is not limited in this embodiment of this disclosure.

A location corresponding to Length is a length field. A location corresponding to Address is an address field. A value of the length field is used to indicate a quantity of device information included in the first request, that is, a quantity of address fields included in a frame signal corresponding to the first request. The address field is used to indicate device information of a node corresponding to measurement information requested by the first request.

For example, when a category field value of a frame signal sent by the to-be-positioned node to the first node is 4, an action field value thereof is 34, a length field value thereof is 2, and values of two address fields thereof are MAC addresses of two second nodes, respectively, the frame signal is used to request, from the first node, measurement information between the first node and the two second nodes.

The first request is sent using the frame format including the category field, the action field, the length field, and the N address fields such that information included in the first request can be sent completely while bandwidth is occupied as less as possible. This can increase a success rate of sending a request, and improve positioning efficiency.

It should be noted that in the request frame format provided in FIG. 2D, each of the category field, the action field, and the length field occupies one byte, and each address field occupies six bytes. A quantity of bytes occupied by each field is set in the frame format such that the frame signal occupies less bandwidth while information is sent completely. Certainly, a quantity of bytes occupied by the address field may be correspondingly adjusted according to different categories of device information stored in the address field. In this embodiment of this disclosure, a quantity of bytes occupied by each field is not limited.

Step 203. The first node receives the first request.

Step 204. The first node sends measurement information to the to-be-positioned node, where the measurement information includes at least location information of the N second nodes and distances between the first node and the N second nodes.

After receiving the first request sent by the to-be-positioned node, the first node obtains, according to device information in the address field of the request, measurement information corresponding to the device information, and returns the measurement information to the to-be-positioned node.

The measurement information may include location information of the first node in addition to the location information of the N second nodes and the distances between the first node and the N second nodes. A method for obtaining the location information of the first node may be obtaining the location information of the first node according to distances between the first node and at least three second nodes and location information of the at least three second nodes. Alternatively, the location information of the first node may be obtained using another method, such as the positioning method provided in this embodiment of this disclosure. This is not limited in this embodiment of this disclosure.

A process of obtaining the distances between the first node and the N second nodes may be implemented using the FTM distance measurement method in step 201, or the distances may be obtained using another distance measurement method. This is not limited in this embodiment of this disclosure.

The location information of the at least one second node may be obtained in a process in which the first node performs distance measurement between the first node and the at least one second node and stored in the first node, or may be obtained by the first node from the second node after the first request sent by the to-be-positioned node is received, or may be obtained at another time. A specific time at which the location information of the at least one second node is obtained is not limited in this embodiment of this disclosure.

In another embodiment of this disclosure, a frame format used for sending a distance between the first node and the at least one second node to the to-be-positioned node includes a category field, an action field, a length field, and N distance fields. Each distance field includes an address field, a distance subfield, and an allowed error value field. The category field is used to indicate whether the measurement information is a public action frame signal. The action field is used to indicate a frame signal type. The length field is used to store a quantity N of device information of the N second nodes. In each distance field, the distance subfield is used to indicate information about a distance between the first node and any one of the N second nodes, each address field is used to store device information of one second node, and the allowed error value field is used to indicate a maximum allowed measurement error value of the distance.

Figure 2E:
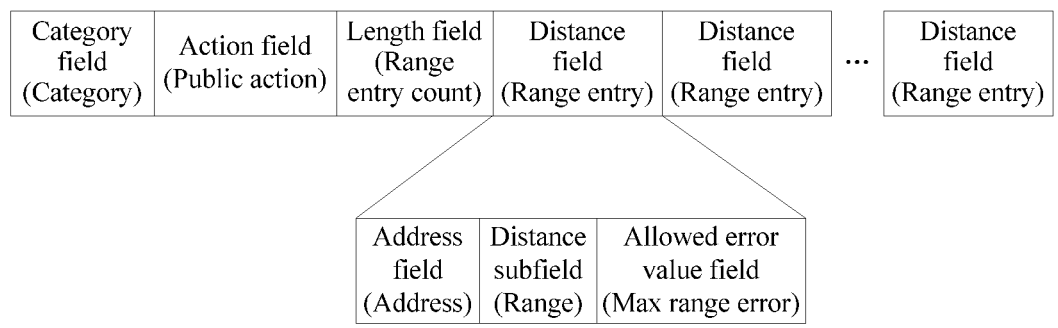
FIG. 2E is a schematic diagram of a report frame format according to an embodiment of this disclosure.

FIG. 2E is a schematic diagram of a report frame format according to an embodiment of this disclosure. In FIG. 2E, a location corresponding to Category is a category field, and a location corresponding to Public action is an action field. Definitions of the category field and the action field are similar to those of the category field and the action field in the frame signal corresponding to the first request in step 202. Details are not described herein again.

A location corresponding to Range entry count is a length field. A location corresponding to Range entry is a distance field. The length field is used to indicate a quantity of distances included in the measurement information, that is, a quantity of distance fields included in a frame signal corresponding to the measurement information. As shown in FIG. 2E, each distance field includes Address, Range, and Max range error. A location corresponding to Address is an address field used to store information about a device corresponding to device information included in the first request. A location corresponding to Range is a distance subfield used to indicate a distance between the first node and a second node corresponding to the device information. A location corresponding to Max range error is an allowed error value field.

For example, when a category field value of a frame signal sent by the first node to the to-be-positioned node is 4, an action field value thereof is 35, a length field value thereof is 2, and values of two address fields thereof are MAC addresses of two second nodes, respectively, the frame signal is used to return measurement information between the first node and the two second nodes to the to-be-positioned node.

The measurement information is sent using the frame format including the category field, the action field, the length field, and the N distance fields such that information included in the measurement information can be sent completely while bandwidth is occupied as less as possible. This can increase a success rate of sending measurement information, and improve positioning efficiency.

It should be noted that in the report frame format provided in FIG. 2E, each of the category field, the action field, and the length field occupies one byte, each distance subfield occupies nine bytes, among which sixth bytes are used for device information of a node, two bytes are used for a distance, and one byte is used for an allowed error value. A quantity of bytes occupied by each field is set in the frame format such that the frame signal occupies less bandwidth while information is sent completely. Certainly, a quantity of bytes occupied by each field in the report frame may be different from the foregoing corresponding quantity of bytes. This is not limited in this embodiment of this disclosure.

Step 205. The to-be-positioned node receives the measurement information returned by the first node, where the measurement information includes at least the location information of the N second nodes and the distances between the first node and the N second nodes.

Step 206. The to-be-positioned node obtains location information of the to-be-positioned node according to the measurement information and measurement time information that is obtained through monitoring in the process in which the first node performs distance measurement.

When a quantity of second nodes in a monitoring area of the to-be-positioned node varies, a different method for obtaining location information of the to-be-positioned node according to the measurement information and measurement time information that is obtained through monitoring in the process in which the first node performs distance measurement is used. Further, there may be the following two cases.

Figure 2F:
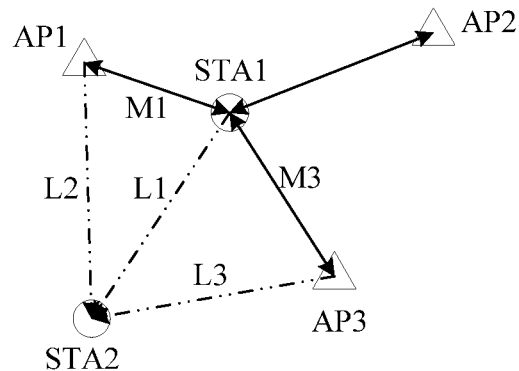
FIG. 2F is a schematic diagram of a positioning implementation environment according to an embodiment of this disclosure.

Case 1: When only two second nodes exist in the monitoring area of the to-be-positioned node, that is, N is 2, and that is, the to-be-positioned node can only monitor a process in which the first node performs distance measurement between the first node and the two second nodes, as shown in FIG. 2F, an STA1 is the first node, an STA2 is the to-be-positioned node, and an AP1, an AP2, and an AP3 are the second nodes, M1 is a distance between the STA1 and the AP1, M3 is a distance between the STA1 and the AP3, L1 is a distance between the STA2 and the STA1, L2 is a distance between the STA2 and the AP1, and L3 is a distance between the STA2 and the AP3. When the STA2 can monitor only processes of distance measurement performed between the STA1 and the AP1 and between the STA1 and the AP3 (that is, the AP2 is located out of a monitoring area of the STA2), a method for obtaining location information of the to-be-positioned node according to the measurement information and measurement time information that is obtained through monitoring in the process in which the first node performs distance measurement may be as follows.

Before the location information of the to-be-positioned node is obtained, when the measurement information includes at least M1, M3, $(X_{STA1}, Y_{STA1})$, $(X_{AP1}, Y_{AP1})$, and $(X_{AP3}, Y_{AP3})$, a distance value L1 is obtained. $(X_{STA1}, Y_{STA1})$, $(X_{AP1}, Y_{AP1})$, and $(X_{AP3}, Y_{AP3})$ are location information of the STA1, location information of the AP1, and location information of the AP3, respectively.

$D_{(STA2-STA1, STA2-AP1)}$=L1−L2 and $D_{(STA2-STA1, STA2-AP3)}$=L1−L3 are separately obtained according to M1, M3, and the measurement time information. The measurement time information is time information obtained through monitoring in steps 201 to 203. A method for obtaining the distance difference is similar to the method for obtaining a distance difference in step 201, and details are not described herein again.

The other two node-distances L2 and L3 are obtained according to $D_{(STA2-STA1, STA2-AP1)}$, $D_{(STA2-STA1, STA2-AP3)}$, and obtained L1. That is, when the node distance L1 is obtained, values of L2 and L3 are obtained according to $D_{(STA2-STA1, STA2-AP1)}$=L1−L2 and $D_{(STA2-STA1, STA2-AP3)}$=L1−L3.

The location information of the to-be-positioned node is obtained according to L1, L2, L3, $(X_{STA1}, Y_{STA1})$, $(X_{AP1}, Y_{AP1})$, and $(X_{AP3}, Y_{AP3})$. Further, location information $(X_{STA2}, Y_{STA2})$ of the STA2 is obtained according to the following formula (3) to achieve an objective of position in the STA2:

$$\begin{cases} (X_{STA1} - X_{STA2})^2 + (Y_{STA1} - Y_{STA2})^2 = L1^2 \\ (X_{AP1} - X_{STA2})^2 + (Y_{AP1} - Y_{STA2})^2 = L2^2 \\ (X_{AP3} - X_{STA2})^2 + (Y_{AP3} - Y_{STA2})^2 = L3^2 \end{cases} \quad (3)$$

According to the foregoing positioning method, in a process of positioning the to-be-positioned node, a distance measurement method needs to be used to measure only once a distance between the to-be-positioned node and the first node or any second node in the monitoring area, and an objective of positioning the to-be-positioned node is achieved according to the distance, the measurement information obtained from the first node, and measurement time information that is obtained through monitoring in a monitoring process in which distance measurement is performed between the first node and two second nodes that are in the monitoring area of the to-be-positioned node, reducing times of performing distance measurement between the to-be-positioned node and other nodes. This simplifies a positioning process and improves positioning efficiency.

Figure 2G:
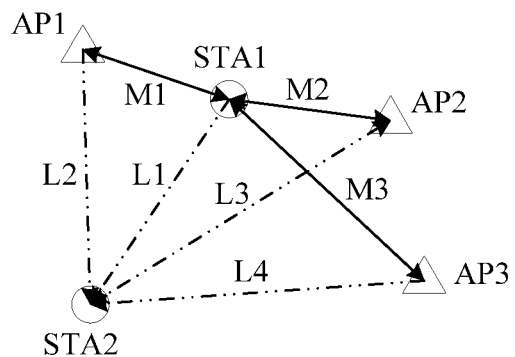
FIG. 2G is a schematic diagram of another positioning implementation environment according to an embodiment of this disclosure.

Case 2: When at least three second nodes exist in the monitoring area of the to-be-positioned node, that is, N is 3, and that is, the to-be-positioned node can monitor a process in which the first node performs distance measurement between the first node and the at least three second nodes, as shown in FIG. 2G, an STA1 is the first node, an STA2 is the to-be-positioned node, an AP1, an AP2, and an AP3 are the second nodes, M1 is a distance between the STA1 and the AP1, M2 is a distance between the STA1 and the AP2, M3 is a distance between the STA1 and the AP3, L1 is a distance between the STA2 and the STA1, L2 is a distance between the STA2 and the AP1, L3 is a distance between the STA2 and the AP2, and L4 is a distance between the STA2 and the AP3. When the STA2 can monitor processes in which distance measurement is performed between the STA1 and the AP1, between the STA1 and the AP2, and between the STA1 and the AP3, a method for obtaining location information of the to-be-positioned node according to the measurement information and measurement time information that is obtained through monitoring in the process in which the first node performs distance measurement may be separately obtaining $D_{(STA2-AP2, STA2-AP1)}$=L3−L2, $D_{(STA2-AP3, STA2-AP1)}$=L4−L2, and $D_{(STA2-AP3, STA2-AP2)}$=L4−L3 according to $D_{(STA2-STA1, STA2-AP1)}$=L1−L2, $D_{(STA2-STA1, STA2-AP2)}$=L1−L3, and $D_{(STA2-STA1, STA2-AP3)}$=L1−L4, where a method for obtaining $D_{(STA2-STA1, STA2-AP1)}$=L1−L2, $D_{(STA2-STA1, STA2-AP2)}$=L1−L3, and $D_{(STA2-STA1, STA2-AP3)}$=L1−L4 is similar to the method for obtaining a distance difference in step 201, and details are not described herein again, and obtaining the location information of the to-be-positioned node according to $D_{(STA2-AP2, STA2-AP1)}$, $D_{(STA2-AP3, STA2-AP1)}$, $D_{(STA2-AP3, STA2-AP2)}$, $(X_{AP1}, Y_{AP1})$, $(X_{AP2}, Y_{AP2})$, and $(X_{AP3}, Y_{AP3})$.

The foregoing positioning method can position the to-be-positioned node without using location information of the first node. Because the location information of the first node also needs to be obtained using a positioning method, an error is inevitable. If the location information of the first node is not used, and only the measurement time information that is obtained, through monitoring, by the to-bepositioned node in the process in which the first node performs distance measurement and the measurement information obtained by the to-be-positioned node from the first node are used for positioning the to-be-positioned node, a greater error caused by the error existing when the location information of the first node is used can be avoided. That is, the foregoing positioning method can improve positioning accuracy while reducing times of performing distance measurement between the to-be-positioned node and other nodes, simplifying a positioning process, and improving positioning efficiency.

In another embodiment of this disclosure, the first node is configured to store measurement information of at least one first node. When the first node is configured to store measurement information of at least one first node, the first node may be a node whose location is known, such as an AP node, or may be a node whose location is unknown. This is not limited in this embodiment of this disclosure. The first node is configured to store measurement information of at least one first node in order to return, when receiving the first request sent by the to-be-positioned node, measurement information required by the to-be-positioned node to the to-be-positioned node. That is, when the first node is a node configured to store measurement information of at least one first node, positioning methods corresponding to the foregoing two cases may be replaced with the following method.

As shown in FIG. 2G, after the STA1 performs distance measurement between the STA1 and the AP1, the AP2, and the AP3 to position the STA1, the STA1 reports, to the first node, distances between the STA1 and the AP1, between the STA1 and the AP2, and between the STA1 and the AP3, location information of the STA1, and device information of the STA1, the AP1, the AP2, and the AP3 that are obtained in the process, and the first node stores the information reported by the STA1. A specific storage format is shown in Table 1.

TABLE 1

| Address pair | Range | Max range error |
|---|---|---|
| MAC (STA1) & MAC (AP1) | Range 1 | Error 1 |
| MAC (STA1) & MAC (AP2) | Range 2 | Error 2 |
| MAC (STA1) & MAC (AP3) | Range 3 | Error 3 |

A location corresponding to Address pair is used to store device information of a pair of nodes, and in this embodiment of this disclosure, storing MAC addresses of a pair of nodes is used as an example for description. A location corresponding to Range is used to store a distance between a pair of nodes corresponding to Address pair. A location corresponding to Max range error is used to store a corresponding allowed error value.

The to-be-positioned node performs monitoring when another first node different from the first node performs distance measurement, obtains and stores measurement time information, and sends a first request to the first node after the to-be-positioned node completes reporting measurement information. A frame format of the first request includes a category field, an action field, a length field, and at least one address pair field. The category field is used to indicate whether the first request is a public action frame signal. The action field is used to indicate a frame signal type. The length field is used to store a quantity N of device information of the N second nodes. Each address pair field is used to store device information of the first node and device information of any one of the N second nodes, and is used to instruct to obtain a distance between two nodes corresponding to the two pieces of device information.

Figure 2H:
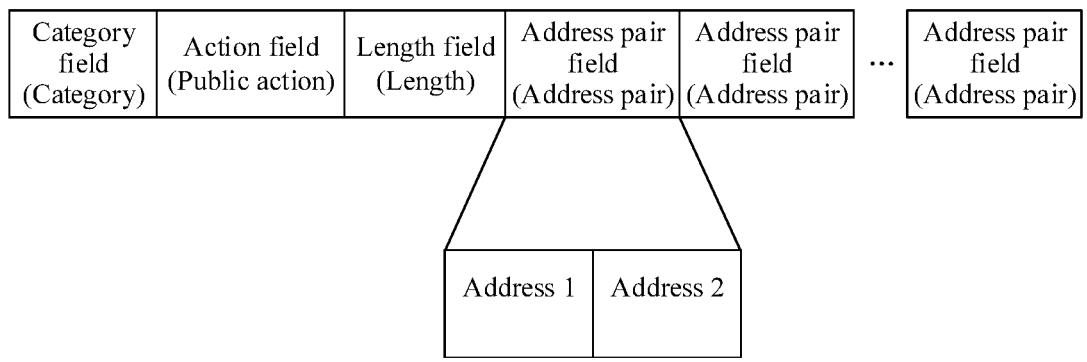
FIG. 2H is a schematic diagram of another request frame format according to an embodiment of this disclosure.

FIG. 2H is a schematic diagram of another request frame format according to an embodiment of this disclosure. Definitions of a category field and an action field are similar to those in step 204, and details are not described herein again. In FIG. 2H, a location corresponding to Length is a length field, and a location corresponding to Address pair is an address pair field. The length field is used to store a quantity N of device information of the N second nodes, that is, to indicate a quantity of device information included in the first request, and that is, a quantity of address pair fields included in a frame signal corresponding to the first request.

It should be noted that each of the category field, the action field, and the length field may occupy one byte, and the address pair field may occupy 12 bytes, that is, each address occupies six bytes. Certainly, in the frame format shown in FIG. 2H, each field may occupy another quantity of bytes, and this is not limited in this embodiment of this disclosure.

After receiving the first request, the first node returns corresponding measurement information to the to-be-positioned node according to a value of an address pair field in the first request. A frame format of the measurement information includes a category field, an action field, a length field, and at least one distance field. Each distance field includes an address pair field, a distance subfield, and an allowed error value field. The category field is used to indicate whether the measurement information is a public action frame signal. The action field is used to indicate a frame signal type. The length field is used to store a quantity N of device information of the N second nodes, that is, to indicate a quantity of distances included in the measurement information. In each distance field, the address pair field is used to store device information of the first node and device information of any one of the N second nodes, the distance subfield is used to store a distance between the first node and the second node, and the allowed error value field is used to indicate a maximum allowed measurement error value of the distance stored in the distance subfield.

Figure 2I:
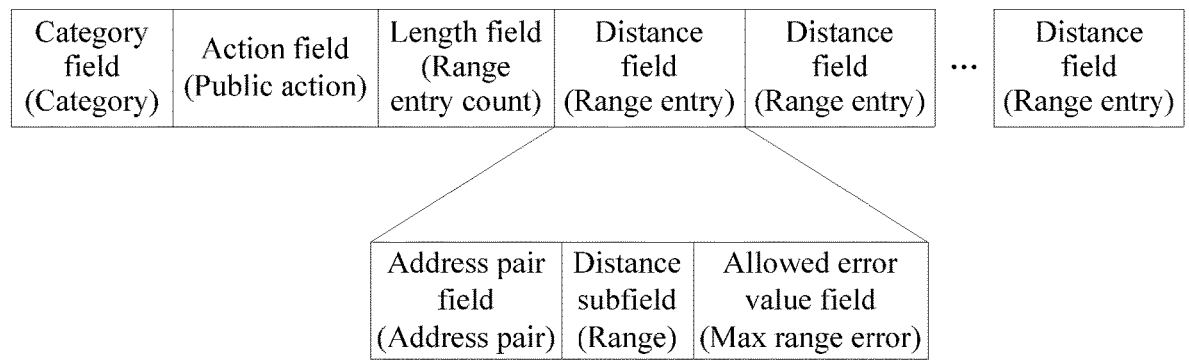
FIG. 2I is a schematic diagram of another report frame format according to an embodiment of this disclosure.

FIG. 2I is a schematic diagram of another report frame format according to an embodiment of this disclosure. The report frame is used to send a distance between the first node and at least one second node to the to-be-positioned node. Definitions of a category field and an action field are similar to those in step 204, and details are not described herein again. In FIG. 2I, a location corresponding to Range entry count is a length field, and a location corresponding to Range entry is a distance subfield. The length field is used to indicate a quantity of distances included in the measurement information, that is, to indicate a quantity of distance fields included in a frame signal corresponding to the measurement information.

It should be noted that each of the category field, the action field, and the length field may occupy one byte, and each distance field may occupy 15 bytes including a 12-byte address pair, a two-byte distance, and a one-byte allowed error value. Certainly, in the frame format shown in FIG. 2I, each field may occupy another quantity of bytes, and this is not limited in this embodiment of this disclosure.

A method for obtaining, by the to-be-positioned node, location information of the to-be-positioned node according to measurement information obtained from the first node and measurement time information obtained in a process in which the to-be-positioned node monitors distance measurement performed by the first node is similar to the method for obtaining location information of the to-be-positioned node in Case 2. Details are not described herein again.

The first node stores measurement information of at least one first node in order to ensure that when being positioned, the to-be-positioned node directly obtains, from the first node, measurement information required for positioning the to-be-positioned node, to implement positioning. In addition, when a location of the first node is known, positioning efficiency can further be improved, and a positioning error can be reduced.

In still another embodiment of this disclosure, before the to-be-positioned node performs monitoring, that is, before steps 201 to 203 are performed, the to-be-positioned node sends a second request to the first node, where the second request is used to query for at least a distance measurement time, receives a distance measurement time returned by the first node, and performs, according to the distance measurement time, the step of monitoring distance measurement performed by the first node.

The first node is queried for the distance measurement time, and a monitoring state is entered according to the distance measurement time returned by the first node such that a case in which relatively large energy consumption is caused because the monitoring state is kept all the time can be avoided. That is, querying for the distance measurement time is performed such that less energy is consumed when the first node does not perform distance measurement for a long time and the to-be-positioned node keeps in the monitoring state all the time.

In yet another embodiment of this disclosure, the second request is further used to query whether the measurement information is allowed to be returned, and accordingly, before the first request is sent to the first node, the step of sending a first request to a first node is performed when reply information is received. The reply information is used to indicate that the measurement information is allowed to be returned. That is, the second request is used to query the first node whether to agree to assist the to-be-positioned node in positioning. If the first node agrees, the step of sending a first request to a first node is performed. If the first node disagrees, a step of sending the second request to another first node continues to be performed.

The first node is queried whether to agree to return the measurement information, and when the reply information used to indicate that the measurement information is allowed to be returned is received, the step of sending the first request to the first node is performed. This can increase a probability of successful positioning and avoid an excessively long waiting time caused because the first node is unable to or disagrees to return the measurement information, and further, can improve positioning efficiency.

According to the method provided in this embodiment of this disclosure, the to-be-positioned node obtains measurement information from the first node, and positions the to-be-positioned node according to the measurement information obtained in a process in which the first node measures a distance between the first node and another node, reducing times of performing distance measurement between the to-be-positioned node and other nodes to obtain measurement information. This can simplify a positioning process and improve positioning efficiency. Further, the first node is queried for the distance measurement time, and the monitoring state is entered according to the distance measurement time returned by the first node such that a case in which relatively large energy consumption is caused because the to-be-positioned node keeps in the monitoring state all the time can be avoided. That is, querying for the distance measurement time is performed such that less energy is consumed when the first node does not perform distance measurement for a long time and the to-be-positioned node keeps in the monitoring state all the time.

Figure 3:
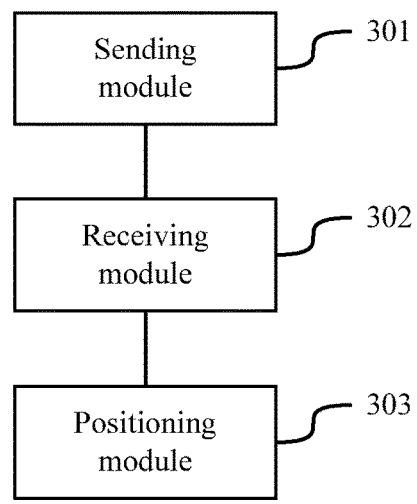
FIG. 3 is a block diagram of a positioning apparatus according to an embodiment of this disclosure.

FIG. 3 is a block diagram of a positioning apparatus according to an embodiment of this disclosure. Referring to FIG. 3, the apparatus includes a sending module 301, a receiving module 302, and a positioning module 303.

The sending module 301 is configured to send a first request to a first node, where the first request includes device information of N second nodes, and N is a positive integer greater than or equal to 1.

The receiving module 302 is configured to receive measurement information returned by the first node, where the measurement information includes at least location information of the N second nodes and distances between the first node and the N second nodes.

The positioning module 303 is configured to obtain location information of the to-be-positioned node according to the measurement information and measurement time information that is obtained through monitoring in a process in which the first node performs distance measurement.

In a first possible implementation provided in this disclosure, a frame format of the first request includes a category field, an action field, a length field, and N address fields, where the category field is used to indicate whether the first request is a public action frame signal, the action field is used to indicate a frame signal type, the length field is used to store a quantity N of device information of the N second nodes, and each address field is used to store device information of one second node.

In a second possible implementation provided in this disclosure, a frame format of the measurement information includes a category field, an action field, a length field, and N distance fields, and each distance field includes an address field, a distance subfield, and an allowed error value field, where the category field is used to indicate whether the measurement information is a public action frame signal, the action field is used to indicate a frame signal type, the length field is used to store a quantity N of device information of the N second nodes, and in each distance field, the distance subfield is used to indicate a distance between the first node and any one of the N second nodes, each address field is used to store device information of one second node, and the allowed error value field is used to indicate a maximum allowed measurement error value of the distance.

In a third possible implementation provided in this disclosure, the apparatus further includes an obtaining module configured to obtain a distance value L1 when N is 2 and the measurement information includes M1, M3, $(X_{STA1}, Y_{STA1})$, $(X_{AP1}, Y_{AP1})$, and $(X_{AP3}, Y_{AP3})$, and accordingly, the positioning module 303 is configured to separately obtain $D_{(STA2-STA1, STA2-AP1)} = L1 - L2$ and $D_{(STA2-STA1, STA2-AP3)} = L1 - L3$ according to M1, M3, and the measurement time information, obtain the distance value L2 and the distance value L3 according to $D_{(STA2-STA1, STA2-AP1)}$, $D_{(STA2-STA1, STA2-AP3)}$, and the obtained distance value L1, and obtain the location information of the to-be-positioned node according to the distance value L1, the distance value L2, the distance value L3, $(X_{STA1}, Y_{STA1})$, $(X_{AP1}, Y_{AP1})$, and $(X_{AP3}, Y_{AP3})$, where the STA1 is the first node, the STA2 is the to-be-positioned node, the AP1 and the AP3 are the second nodes, M is a distance between the STA1 and the AP1, M3 is a distance between the STA1 and the AP3, $(X_{STA1}, Y_{STA1})$, $(X_{AP1}, Y_{AP1})$, and $(X_{AP3}, Y_{AP3})$ are location information of the STA1, location information of the AP1, and location information of the AP3, respectively, L1 is a distance between the STA2 and the STA1, L2 is a distance between the STA2 and the AP1, and L3 is a distance between the STA2 and the AP3.

In a fourth possible implementation provided in this disclosure, the positioning module 303 is configured to separately obtain $D_{(STA2-STA1,STA2-AP1)}=L1-L2$, $D_{(STA2-STA1,STA2-AP2)}=L1-L3$, and $D_{(STA2-STA1,STA2-AP3)}=L1-L4$ according to M1, M2, M3, and the measurement time information when N is 3 and the measurement information includes M1, M2, M3, $(X_{AP1},Y_{AP1})$, $(X_{AP2},Y_{AP2})$, and $(X_{AP3},Y_{AP3})$, separately obtain $D_{(STA2-AP2,STA2-AP1)}=L3-L2$, $D_{(STA2-AP3,STA2-AP1)}=L4-L2$, and $D_{(STA2-AP3,STA2-AP2)}=L4-L3$ according to $D_{(STA2-STA1,STA2-AP1)}=L1-L2$, $D_{(STA2-STA1,STA2-AP2)}=L1-L3$, and $D_{(STA2-STA1,STA2-AP3)}=L1-L4$, and obtain the location information of the to-be-positioned node according to $D_{(STA2-AP2,STA2-AP1)}$, $D_{(STA2-AP3,STA2-AP1)}$, $D_{(STA2-AP3,STA2-AP2)}$, $(X_{AP1},Y_{AP1})$, $(X_{AP2},Y_{AP2})$, and $(X_{AP3},Y_{AP3})$, where the STA1 is the first node, the STA2 is the to-be-positioned node, the AP1, the AP2, and the AP3 are the second nodes, M is a distance between the STA1 and the AP1, M2 is a distance between the STA1 and the AP2, M3 is a distance between the STA1 and the AP3, $(X_{AP1},Y_{AP1})$, $(X_{AP2},Y_{AP2})$, and $(X_{AP3},Y_{AP3})$ are location information of the AP1, location information of the AP2, and location information of the AP3, respectively, L1 is a distance between the STA2 and the STA1, L2 is a distance between the STA2 and the AP1, L3 is a distance between the STA2 and the AP2, and L4 is a distance between the STA2 and the AP3.

In a fifth possible implementation provided in this disclosure, the first node is configured to store measurement information of at least one first node.

In a sixth possible implementation provided in this disclosure, a frame format of the first request includes a category field, an action field, a length field, and N address pair fields, where the category field is used to indicate whether the first request is a public action frame signal, the action field is used to indicate a frame signal type, the length field is used to store a quantity N of device information of the N second nodes, and each address pair field is used to store device information of the first node and device information of any one of the N second nodes.

In a seventh possible implementation provided in this disclosure, a frame format of the measurement information includes a category field, an action field, a length field, and N distance fields, and each distance field includes an address pair field, a distance subfield, and an allowed error value field, where the category field is used to indicate whether the measurement information is a public action frame signal, the action field is used to indicate a frame signal type, the length field is used to store a quantity N of device information of the N second nodes, and in each distance field, the address pair field is used to store device information of the first node and device information of any one of the N second nodes, the distance subfield is used to store a distance between the first node and the second node, and the allowed error value field is used to indicate a maximum allowed measurement error value of the distance stored in the distance subfield.

In an eighth possible implementation provided in this disclosure, the apparatus further includes a monitoring module (not shown) configured to monitor a process in which distance measurement is performed between the first node and any one of the N second nodes, to obtain the measurement time information, where the monitoring module is configured to receive a measurement signal sent by the second node, store receive time information of the measurement signal and device information of the second node, receive an acknowledgement signal sent by the first node, store receive time information of the acknowledgement signal and device information of the first node, receive signal transmit and receive time information sent by the second node to the to-be-positioned node, where the signal transmit and receive time information includes information about a time at which the second node sends the measurement signal and information about a time at which the second node receives the acknowledgement signal, and store the measurement time information, where the measurement time information includes the signal transmit and receive time information, the receive time information of the measurement signal, and the receive time information of the acknowledgement signal.

In a ninth possible implementation provided in this disclosure, the sending module 301 is further configured to send a second request to the first node, where the second request is used to query for at least a distance measurement time, the receiving module 302 is further configured to receive a distance measurement time returned by the first node, and the monitoring module is further configured to perform, according to the distance measurement time, the step of monitoring a process in which distance measurement is performed between the first node and any one of the N second nodes.

In a tenth possible implementation provided in this disclosure, the second request is further used to query whether the measurement information is allowed to be returned, and accordingly, the sending module 301 is further configured to, when reply information is received, perform the step of sending a first request to a first node. The reply information is used to indicate that the measurement information is allowed to be returned.

It should be noted that, when the positioning apparatus provided in the foregoing embodiment is being positioned, the division of the foregoing function modules is merely used as an example for illustration. In actual application, the foregoing functions may be allocated to and implemented by different function modules according to a requirement, that is, an inner structure of the device is divided into different function modules to implement all or some of the foregoing functions described above. In addition, the positioning apparatus provided in the foregoing embodiment is based on a same inventive concept as the positioning method embodiment. For a specific implementation process of the positioning apparatus, refer to the method embodiment, and details are not described herein again.

Figure 4:
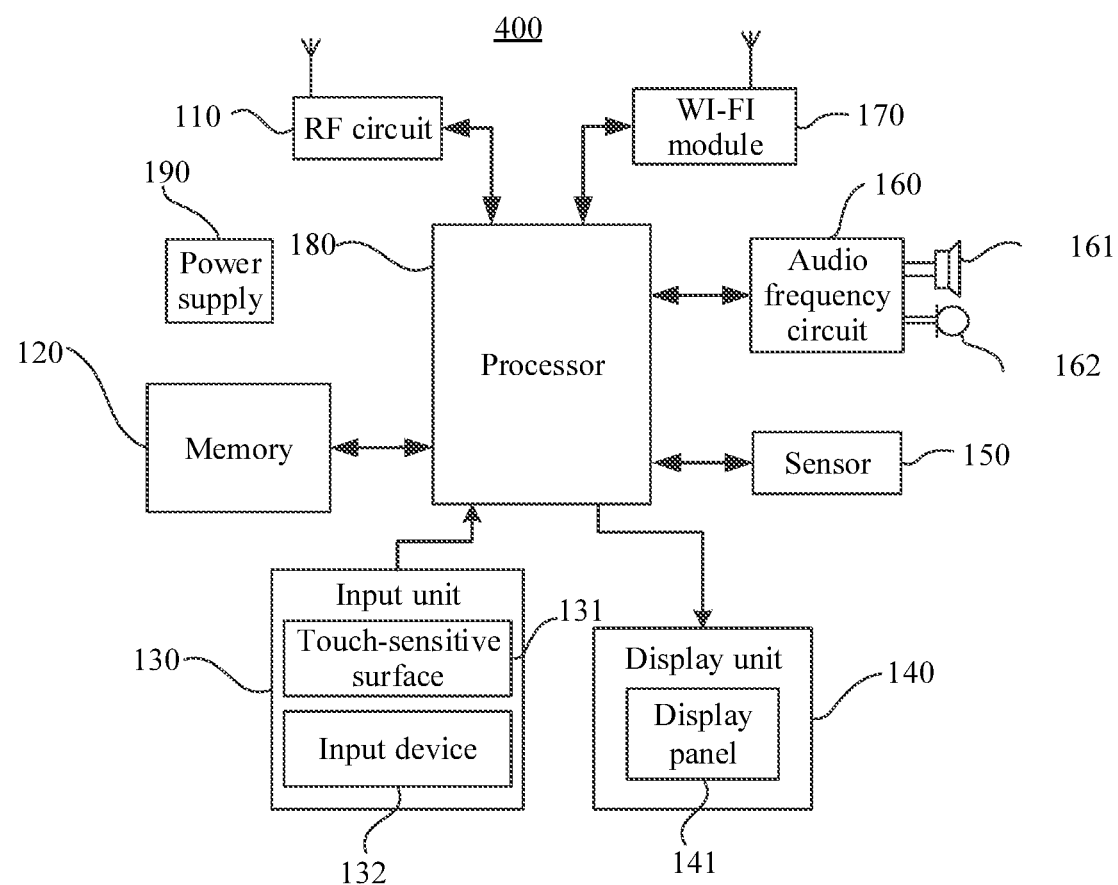
FIG. 4 is a schematic structural diagram of a node device 400 according to an embodiment of this disclosure.

An embodiment provides a node device. The node device may be configured to execute the positioning methods provided in all of the foregoing embodiments. Referring to FIG. 4, the node device 400 includes as follows.

The node device 400 may include a Radio Frequency (RF) circuit 110, a memory 120 including one or more computer-readable storage media, an input unit 130, a display unit 140, a sensor 150, an audio frequency circuit 160, a WI-FI module 170, a processor 180 including one or more processing cores, a power supply 190, and other components. A person skilled in the art may understand that a terminal (the node device 400) structure shown in FIG. 4 does not constitute a limitation on the terminal, and the terminal may include components more or fewer than those shown in the figure, or a combination of some components, or components disposed differently.

The RF circuit 110 may be configured to receive and send information, or receive and send a signal in a call process. In particular, the RF circuit 110 receives downlink information of a base station and then sends the downlink information to one or more processors 180 for processing, and also sends related uplink data to the base station. Usually, the RF circuit 110 includes but is not limited to an antenna, at least one amplifier, a tuner, one or more oscillators, a subscriber identity module (SIM) card, a transceiver, a coupler, a low noise amplifier (LNA), and a duplexer. In addition, the RF circuit 110 may communicate with bidirectionally a network and another device using wireless communication. The wireless communication may be implemented using the WI-FI module 170.

The memory 120 may be configured to store a software program and a module. The processor 180 runs the software program and the module that are stored in the memory 120 in order to execute various functions and applications and perform data processing. The memory 120 may mainly include a program storage area and a data storage area. The program storage area may store an operating system, an application program required for at least one function (such as a voice playback function and an image playback function), and the like. The data storage area may store data (such as measurement time information, audio data, and a phone book) created according to use of the node device 400, and the like. In addition, the memory 120 may include a high-speed random access memory (RAM), and may further include a non-volatile memory, such as at least one disk storage device, a flash memory device, or another volatile solid-state storage device. Accordingly, the memory 120 may further include a memory controller to provide access of the processor 180 and the input unit 130 to the memory 120.

The input unit 130 may be configured to receive input digital or character information, and generate signal input that is obtained using a keyboard, a mouse, a joystick, optics, or a trackball and that is related to user settings and function control. Further, the input unit 130 may include a touch-sensitive surface 131 and an input device 132. The touch-sensitive surface 131 is also referred to as a touch display screen or a touch panel, and may collect a touch operation (such as an operation performed by a user on or near the touch-sensitive surface 131 using any proper object or accessory, such as a finger or a stylus) performed by the user on or near the touch-sensitive surface 131, and drive a corresponding connecting apparatus according to a preset program. Optionally, the touch-sensitive surface 131 may include two parts a touch detection apparatus and a touch controller. The touch detection apparatus detects a touch orientation of a user, detects a signal generated by a touch operation, and transmits the signal to the touch controller. The touch controller receives touch information from the touch detection apparatus, converts the touch information into contact coordinates, and sends the contact coordinates to the processor 180, and can receive a command sent by the processor 180 and execute the command. In addition, the touch-sensitive surface 131 may be a resistive type, a capacitive type, an infrared type, a surface acoustic wave type, or another type. In addition to the touch-sensitive surface 131, the input unit 130 may further include the input device 132. Further, the input device 132 may include but is not limited to one or more of a physical keyboard, a function key (such as a volume control key or a power on/off key), a trackball, a mouse, or a joystick.

The display unit 140 may be configured to display information input by the user or information provided to the user, and various graphical user interfaces of the node device 400. These graphical user interfaces may include a graph, a text, an icon, a video, or any combination thereof. The display unit 140 may include a display panel 141. Optionally, the display panel 141 may be configured in a form of a Liquid Crystal Display (LCD), an Organic Light-Emitting Diode (OLED), or the like. Further, the touch-sensitive surface 131 may cover the display panel 141. After detecting a touch operation on or near the touch-sensitive surface 131, the touch-sensitive surface 131 transfers information about the touch operation to the processor 180 to determine a touch event type, and then the processor 180 provides corresponding visual output on the display panel 141 according to the touch event type. In FIG. 4, the touch-sensitive surface 131 and the display panel 141 are configured as two independent components to implement input and output functions. However, in some embodiments, the touch-sensitive surface 131 and the display panel 141 may be integrated to implement the input and output functions.

The node device 400 may further include at least one sensor 150, for example, a light sensor, a motion sensor, and another sensor. Further, the light sensor may include an ambient light sensor and a proximity sensor. The ambient light sensor may adjust luminance of the display panel 141 according to brightness of ambient light. The proximity sensor may turn off the display panel 141 and/or backlight when the node device 400 moves close to an ear. As a type of motion sensor, a gravitational acceleration sensor may detect magnitudes of acceleration in all directions (usually, three axes), may detect a magnitude and a direction of gravity when being static, and may be used for an application that recognizes a posture (such as screen switching between a landscape mode and a portrait mode, a related game, and magnetometer posture calibration) of the mobile phone (the node device), a vibration-identification-related function (such as a pedometer and tapping), and the like. Other sensors that can be configured in the node device 400 such as a gyroscope, a barometer, a hygrometer, a thermometer, and an infrared sensor are not described herein.

The audio frequency circuit 160, a loudspeaker 161, and a microphone 162 may provide an audio interface between a user and the node device 400. The audio frequency circuit 160 may transmit, to the loudspeaker 161, an electrical signal that is obtained after conversion of received audio data, and the loudspeaker 161 converts the electrical signal into a sound signal and outputs the sound signal. In addition, the microphone 162 converts a collected sound signal into an electrical signal, the audio frequency circuit 160 receives and converts the electrical signal into audio data and outputs the audio data to the processor 180 for processing, and then processed data is sent to, for example, another terminal, using the RF circuit 110, or the audio data is output to the memory 120 for further processing. The audio frequency circuit 160 may further include an earphone jack to facilitate communication between a peripheral earphone and the node device 400.

WI-FI is a short-distance wireless transmission technology. With the WI-FI module 170, the node device 400 may help the user receive and send an email, browse a web page, access streaming media, and the like. The WI-FI module 170 provides wireless broadband Internet access to the user. The WI-FI module 170 is a necessary component of the node device provided in this disclosure.

The processor 180 is a control center of the node device 400, is connected to all the parts of the entire mobile phone using various interfaces and lines, and executes, by running or executing the software program and/or the module that are/is stored in the memory 120 and by invoking data stored in the memory 120, various functions of the mobile phone and data processing in order to perform overall monitoring on the mobile phone. Optionally, the processor 180 may include one or more processing cores. An application processor and a modem processor may be integrated into the processor 180. The application processor mainly processes an operating system, a user interface, an application program, and the like. The modem processor mainly processes wireless communication. It can be understood that, the modem processor may alternatively not be integrated into the processor 180.

The node device 400 further includes a power supply 190 (such as a battery) that supplies power to each component. The power supply may be logically connected to the processor 180 using a power supply management system in order to implement functions such as charging management, discharging management, and power consumption management using the power supply management system. The power supply 190 may further include any component of one or more direct current power supplies or alternating current power supplies, a recharging system, a power supply fault detection circuit, a power converter or a power inverter, or a power status indicator.

Although not shown, the node device 400 may further include a camera, a BLUETOOTH module, or the like, and details are not further described herein. Further, in this embodiment, a display unit of the terminal is a touchscreen display. The terminal may further include a memory and one or more programs. The one or more programs are stored in the memory, and are executed by one or more processors after being configured. The one or more programs include instructions for performing the following operations sending a first request to a first node, where the first request includes at least device information of the first node and device information of at least two second nodes, receiving measurement information returned by the first node, where the measurement information includes at least location information of the first node that is obtained in a process in which the first node performs distance measurement, location information of the at least two second nodes, and distances between the first node and the at least two second nodes, and obtaining location information of a to-be-positioned node according to the measurement information and measurement time information that is obtained by monitoring in a process in which the first node performs distance measurement.

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, or an optical disc.

The foregoing descriptions are merely examples of embodiments of this disclosure, but are not intended to limit this disclosure. Any modification, equivalent replacement, or improvement made without departing from the spirit and principle of this disclosure should fall within the protection scope of this disclosure.

What is claimed is:

1. A positioning method implemented by a to-be-positioned node, comprising:
   sending a first request to a first node, wherein the first request comprises device information of N second nodes, and wherein the N is a positive integer greater than or equal to one;
   receiving measurement information from the first node, wherein the measurement information comprises location information of the N second nodes, a distance between the first node and any of the N second nodes, and a maximum allowed measurement error value of the distance; and
   obtaining location information of the to-be-positioned node according to the measurement information and measurement time information obtained through monitoring a process in which the first node acquires a distance measurement.

2. The positioning method of claim 1, wherein a frame format of the first request comprises a category field, an action field, a length field, and N address fields, wherein the category field indicates whether the first request is a public action frame signal, wherein the action field indicates a frame signal type, wherein the length field stores a quantity of the device information of the N second nodes, wherein the quantity of the device information of the N second nodes is equal to the N, and wherein each address field stores device information of one second node.

3. The positioning method of claim 1, wherein a frame format of the measurement information comprises a category field, an action field, a length field, and N distance fields, wherein the category field indicates whether the measurement information is a public action frame signal, wherein the action field indicates a frame signal type, wherein the length field stores a quantity of the device information of the N second nodes, wherein the quantity of the device information of the N second nodes is equal to the N, wherein each distance field comprises an address field, a distance subfield, and an allowed error value field, wherein in each distance field, the distance subfield indicates the distance between the first node and any of the N second nodes, wherein each address field stores device information of one second node, and wherein the allowed error value field indicates the a maximum allowed measurement error value of the distance.

4. The positioning method of claim 1, further comprising obtaining an L1 when the N is two and the measurement information comprises M1, M3, $(X_{STA1},Y_{STA1})$, $(X_{AP1},Y_{AP1})$, and $(X_{AP3},Y_{AP3})$, and wherein obtaining the location information of the to-be-positioned node comprises:
   separately obtaining $D_{(STA2-STA1,STA2-AP1)}=L1-L2$ and $D_{(STA2-STA1,STA2-AP3)}=L1-L3$ according to the M1, the M3, and the measurement time information;
   obtaining the L2 and the L3 according to the $D_{(STA2-STA1,STA2-AP1)}$, the $D_{(STA2-STA1,STA2-AP3)}$, and the L1; and
   obtaining the location information of the to-be-positioned node according to the L1, the L2, the L3, the $(X_{STA1},Y_{STA1})$, the $(X_{AP1},Y_{AP1})$, and the $(X_{AP3},Y_{AP3})$, wherein the STA1 is the first node, wherein the STA2 is the to-be-positioned node, wherein the AP1 and the AP3 are the second nodes, wherein the M1 is a distance between the STA1 and the AP1, wherein the M3 is a distance between the STA1 and the AP3, wherein the $(X_{STA1},Y_{STA1})$ is location information of the STA1, wherein the $(X_{AP1},Y_{AP1})$ is location information of the AP1, wherein the $(X_{AP3},Y_{AP3})$ is location information of the AP3, wherein the L1 is a distance between the STA2 and the STA1, wherein the L2 is a distance between the STA2 and the AP1, and wherein the L3 is a distance between the STA2 and the AP3.

5. The positioning method of claim 1, wherein obtaining the location information of the to-be-positioned node comprises:
   separately obtaining $D_{(STA2-STA1,STA2-AP1)}=L1-L2$, $D_{(STA2-STA1,STA2-AP2)}=L1-L3$, and $D_{(STA2-STA1,STA2-AP3)}=L1-L4$ according to M1, M2, M3, and the measurement time information when the N is three and the measurement information comprises the M1, the M2, the M3, $(X_{AP1},Y_{AP1})$, $(X_{AP2},Y_{AP2})$, and $(X_{AP3},Y_{AP3})$;

separately obtaining $D_{(STA2-AP2,STA2-AP1)}=L3-L2$, $D_{(STA2-AP3,STA2-AP1)}=L4-L2$, and $D_{(STA2-AP3,STA2-AP2)}=L4-L3$ according to the $D_{(STA2-STA1,STA2-AP1)}=L1-L2$, the $D_{(STA2-STA1,STA2-AP2)}=L1-L3$, and the $D_{(STA2-STA1,STA2-AP3)}=L1-L4$; and obtaining the location information of the to-be-positioned node according to the $D_{(STA2-AP2,STA2-AP1)}$, the $D_{(STA2-AP3,STA2-AP1)}$, the $D_{(STA2-AP3,STA2-AP2)}$, the $(X_{AP1},Y_{AP1})$, the $(X_{AP2},Y_{AP2})$, and the $(X_{AP3},Y_{AP3})$, wherein the STA1 is the first node, wherein the STA2 is the to-be-positioned node, wherein the AP1, the AP2, and the AP3 are the second nodes, wherein the M1 is a distance between the STA1 and the AP1, wherein the M2 is a distance between the STA1 and the AP2, wherein the M3 is a distance between the STA1 and the AP3, wherein the $(X_{AP1},Y_{AP1})$ is location information of the AP1, wherein the $(X_{AP2},Y_{AP2})$ is location information of the AP2, wherein the $(X_{AP3},Y_{AP3})$ is location information of the AP3, wherein the L1 is a distance between the STA2 and the STA1, wherein the L2 is a distance between the STA2 and the AP1, wherein the L3 is a distance between the STA2 and the AP2, and wherein the L4 is a distance between the STA2 and the AP3.

6. The positioning method of claim 1, wherein the first node is configured to store measurement information of at least one first node.

7. The positioning method of claim 6, wherein a frame format of the first request comprises a category field, an action field, a length field, and N address pair fields, wherein the category field indicates whether the first request is a public action frame signal, wherein the action field indicates a frame signal type, wherein the length field stores a quantity of the device information of the N second nodes, wherein the quantity of the device information of the N second nodes is equal to the N, and wherein each address pair field stores device information of the first node and device information of any of the N second nodes.

8. The positioning method of claim 6, wherein a frame format of the measurement information comprises a category field, an action field, a length field, and N distance fields, wherein the category field indicates whether the measurement information is a public action frame signal, wherein the action field indicates a frame signal type, wherein the length field stores a quantity of the device information of the N second nodes, wherein the quantity of the device information of the N second nodes is equal to the N, wherein each distance field comprises an address pair field, a distance subfield, and an allowed error value field, wherein in each distance field, the address pair field stores device information of the first node and device information of any of the N second nodes, wherein the distance subfield stores a distance between the first node and any of the N second nodes, and wherein the allowed error value field indicates a maximum allowed measurement error value of the distance stored in the distance subfield.

9. The positioning method of claim 1, wherein before sending the first request to the first node, the positioning method further comprises monitoring a process in which the distance measurement is performed between the first node and any of the N second nodes to obtain corresponding measurement time information, and wherein monitoring the process in which the distance measurement is performed between the first node and any of the N second nodes comprises:
receiving a measurement signal from any of the N second nodes;
storing receive time information of the measurement signal and device information of any of the N second nodes;
receiving an acknowledgement signal from the first node;
storing receive time information of the acknowledgement signal and device information of the first node;
receiving signal transmit and receive time information from any of the N second nodes to the to-be-positioned node, wherein the signal transmit and receive time information comprises information about a time at which any of the N second nodes sends the measurement signal and information about a time at which any of the N second nodes receives the acknowledgement signal; and
storing the corresponding measurement time information, wherein the corresponding measurement time information comprises the signal transmit and receive time information, the receive time information of the measurement signal, and the receive time information of the acknowledgement signal.

10. The positioning method of claim 9, wherein before monitoring the process in which the distance measurement is performed between the first node and any of the N second nodes, the positioning method further comprises:
sending a second request to the first node, wherein the second request queries for a distance measurement time;
receiving, by the to-be-positioned node, the distance measurement time from the first node; and
performing, by the to-be-positioned node according to the distance measurement time, monitoring the process in which the distance measurement is performed between the first node and any of the N second nodes.

11. A positioning apparatus of a to-be-positioned node, comprising:
a transmitter configured to send a first request to a first node, wherein the first request comprises device information of N second nodes, and wherein the N is a positive integer greater than or equal to one;
a receiver configured to receive measurement information from the first node, wherein the measurement information comprises location information of the N second nodes, a distance between the first node and any of the N second nodes, and a maximum allowed measurement error value of the distance; and
a processor coupled to the transmitter and the receiver and configured to obtain location information of the to-be-positioned node according to the measurement information and measurement time information obtained through monitoring a process in which the first node acquires a distance measurement.

12. The positioning apparatus of claim 11, wherein a frame format of the first request comprises a category field, an action field, a length field, and N address fields, wherein the category field indicates whether the first request is a public action frame signal, wherein the action field indicates a frame signal type, wherein the length field stores a quantity of the device information of the N second nodes, wherein the quantity of the device information of the N second nodes is equal to the N, and wherein each address field stores device information of one second node.

13. The positioning apparatus of claim 11, wherein a frame format of the measurement information comprises a category field, an action field, a length field, and N distance fields, wherein the category field indicates whether the measurement information is a public action frame signal, wherein the action field indicates a frame signal type, wherein the length field stores a quantity of the device information of the N second nodes, wherein the quantity of the device information of the N second nodes is equal to the N, wherein each distance field comprises an address field, a distance subfield, and an allowed error value field, wherein in each distance field, the distance subfield indicates the distance between the first node and any of the N second nodes, wherein each address field stores device information of one second node, and wherein the allowed error value field indicates a maximum allowed measurement error value of the distance.

14. The positioning apparatus of claim 11, wherein the processor is further configured to:
obtain an L1 when the N is two and the measurement information comprises M1, M3, $(X_{STA1}, Y_{STA1})$, $(X_{AP1}, Y_{AP1})$, and $(X_{AP3}, Y_{AP3})$;
separately obtain $D_{(STA2-STA1, STA2-AP1)} = L1-L2$ and $D_{(STA2-STA1, STA2-AP3)} = L1-L3$ according to the M1, the M3, and the measurement time information;
obtain the L2 and the L3 according to the $D_{(STA2-STA1, STA2-AP1)}$, the $D_{(STA2-STA1, STA2-AP3)}$, and the L1; and
obtain the location information of the to-be-positioned node according to the L1, the L2, the L3, the $(X_{STA1}, Y_{STA1})$, the $(X_{AP1}, Y_{AP1})$, and the $(X_{AP3}, Y_{AP3})$, wherein the STA1 is the first node, wherein the STA2 is the to-be-positioned node, wherein the AP1 and the AP3 are the second nodes, wherein the M is a distance between the STA1 and the AP1, wherein the M3 is a distance between the STA1 and the AP3, wherein the $(X_{STA1}, Y_{STA1})$ is location information of the STA1, wherein the $(X_{AP1}, Y_{AP1})$ is location information of the AP1, wherein the $(X_{AP3}, Y_{AP3})$ is location information of the AP3, wherein the L1 is a distance between the STA2 and the STA1, wherein the L2 is a distance between the STA2 and the AP1, and wherein the L3 is a distance between the STA2 and the AP3.

15. The positioning apparatus of claim 11, wherein the processor is further configured to:
separately obtain $D_{(STA2-STA1, STA2-AP1)} = L1-L2$, $D_{(STA2-STA1, STA2-AP2)} = L1-L3$, and $D_{(STA2-STA1, STA2-AP3)} = L1-L4$ according to M1, M2, M3, and the measurement time information when the N is three and the measurement information comprises the M, the M2, the M3, $(X_{AP1}, Y_{AP1})$, $(X_{AP2}, Y_{AP2})$, and $(X_{AP3}, Y_{AP3})$;
separately obtain $D_{(STA2-AP2, STA2-AP1)} = L3-L2$, $D_{(STA2-AP3, STA2-AP1)} = L4-L2$, and $D_{(STA2-AP3, STA2-AP2)} = L4-L3$ according to the $D_{(STA2-STA1, STA2-AP1)} = L1-L2$, $D_{(STA2-STA1, STA2-A2)} = L1-L3$, and $D_{(STA2-STA1, STA2-AP3)} = L1-L4$; and
obtain the location information of the to-be-positioned node according to the $D_{(STA2-AP2, STA2-AP1)}$, $D_{(STA2-AP3, STA2-AP1)}$, the $D_{(STA2-AP3, STA2-AP2)}$, the $(X_{AP1}, Y_{AP1})$, the $(X_{AP2}, Y_{AP2})$, and the $(X_{AP3}, Y_{AP3})$, wherein the STA1 is the first node, wherein the STA2 is the to-be-positioned node, wherein the AP1, the AP2, and the AP3 are the second nodes, wherein the M1 is a distance between the STA1 and the AP1, wherein the M2 is a distance between the STA1 and the AP2, wherein the M3 is a distance between the STA1 and the AP3, wherein the $(X_{AP1}, Y_{AP1})$ is location information of the AP1, wherein the $(X_{AP2}, Y_{AP2})$ location information of the AP2, wherein the $(X_{AP3}, Y_{AP3})$ is location information of the AP3, wherein the L1 is a distance between the STA2 and the STA1, wherein the L2 is a distance between the STA2 and the AP1, wherein the L3 is a distance between the STA2 and the AP2, and wherein the L4 is a distance between the STA2 and the AP3.

16. The positioning apparatus of claim 11, wherein the first node is configured to store measurement information of at least one first node.

17. The positioning apparatus of claim 16, wherein a frame format of the first request comprises a category field, an action field, a length field, and N address pair fields, wherein the category field indicates whether the first request is a public action frame signal, wherein the action field indicates a frame signal type, wherein the length field stores a quantity of the device information of the N second nodes, wherein the quantity of the device information of the N second nodes is equal to the N, and wherein each address pair field stores device information of the first node and device information of any of the N second nodes.

18. The positioning apparatus of claim 16, wherein a frame format of the measurement information comprises a category field, an action field, a length field, and N distance fields, wherein the category field indicates whether the measurement information is a public action frame signal, wherein the action field indicates a frame signal type, wherein the length field stores a quantity of the device information of the N second nodes, wherein the quantity of the device information of the N second nodes is equal to the N, wherein each distance field comprises an address pair field, a distance subfield, and an allowed error value field, wherein in each distance field, the address pair field stores device information of the first node and device information of any of the N second nodes, wherein the distance subfield stores a distance between the first node and any of the N second nodes, and wherein the allowed error value field indicates a maximum allowed measurement error value of the distance stored in the distance subfield.

19. The positioning apparatus of claim 11, wherein the processor is further configured to monitor a process in which the distance measurement is performed between the first node and any of the N second nodes to obtain corresponding measurement time information, wherein the receiver is further configured to receive a measurement signal from any of the N second nodes, wherein the processor is further configured to store receive time information of the measurement signal and device information of any of the N second nodes, wherein the receiver is further configured to receive an acknowledgement signal from the first node, wherein the processor is further configured to store receive time information of the acknowledgement signal and device information of the first node, wherein the receiver is further configured to receive signal transmit and receive time information from the any of the N second nodes to the to-be-positioned node, wherein the signal transmit and receive time information comprises information about a time at which any of the N second nodes sends the measurement signal and information about a time at which any of the N second nodes receives the acknowledgement signal, wherein the processor is further configured to store the corresponding measurement time information, and wherein the corresponding measurement time information comprises the signal transmit and receive time information, the receive time information of the measurement signal, and the receive time information of the acknowledgement signal.

20. The positioning apparatus of claim 19, wherein the transmitter is further configured to send a second request to the first node, wherein the second request queries for a distance measurement time, wherein the receiver is further configured to receive the distance measurement time from the first node, and wherein the processor is further configured to perform, according to the distance measurement time, monitoring the process in which the distance measurement is performed between the first node and any of the N second nodes.

* * * * *

UNITED STATES PATENT AND TRADEMARK OFFICE
CERTIFICATE OF CORRECTION

PATENT NO. : 10,785,743 B2
APPLICATION NO. : 16/277257
DATED : September 22, 2020
INVENTOR(S) : Kaiyao Wang and Yongjun Liu It is certified that error appears in the above-identified patent and that said Letters Patent is hereby corrected as shown below:

In the Claims

Claim 14, Column 31, Line 34: "wherein the M is a" should read "wherein the M1 is a"

Claim 15, Column 31, Line 51: "the M, the M2" should read "the M1, the M2"

Claim 15, Column 31, Line 57: "$D_{(STA2-STA1, STA2-A2)}=L1-L3$" should read "$D_{(STA2-STA1, STA2-AP2)}=L1-L3$"

Signed and Sealed this
Tenth Day of November, 2020

Andrei Iancu
*Director of the United States Patent and Trademark Office*